US012270181B2

(12) United States Patent
Takano et al.

(10) Patent No.: US 12,270,181 B2
(45) Date of Patent: Apr. 8, 2025

(54) WORK MACHINE, SHAFT SEALING STRUCTURE, AND WORK MACHINE INCLUDING THE SEALING STRUCTURE

(71) Applicant: KUBOTA CORPORATION, Osaka (JP)

(72) Inventors: Yuki Takano, Osaka (JP); Kai Inada, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 382 days.

(21) Appl. No.: 17/726,821

(22) Filed: Apr. 22, 2022

(65) Prior Publication Data

US 2022/0243424 A1 Aug. 4, 2022

Related U.S. Application Data

(63) Continuation of application No. PCT/JP2020/042290, filed on Nov. 12, 2020.

(30) Foreign Application Priority Data

Nov. 14, 2019 (JP) .................................. 2019-206251
Nov. 14, 2019 (JP) .................................. 2019-206252

(51) Int. Cl.
*E02F 9/20* (2006.01)
*B60T 7/06* (2006.01)
(Continued)

(52) U.S. Cl.
CPC .............. *E02F 9/2004* (2013.01); *B60T 7/06* (2013.01); *E02F 9/2225* (2013.01);
(Continued)

(58) Field of Classification Search
CPC ..... E02F 9/2004; E02F 9/2225; E02F 9/2253; E02F 9/0841; E02F 9/00; E02F 9/2083;
(Continued)

(56) References Cited

U.S. PATENT DOCUMENTS 11,938,412 B2 * 3/2024 Guidrevitch ............. A63H 1/06
2022/0018089 A1 * 1/2022 Takano ................. E02F 9/2004

FOREIGN PATENT DOCUMENTS

GB 582158 A * 11/1946
GB 852008 A * 10/1960
(Continued)

OTHER PUBLICATIONS

JP-2007055281-A English Translation (Year: 2007).*
(Continued)

*Primary Examiner* — James A Shriver, II
*Assistant Examiner* — Michael T. Walsh
(74) *Attorney, Agent, or Firm* — Greenblum & Bernstein, P.L.C.

(57) ABSTRACT

A work machine includes a machine body, a travel device, a hydraulic drive, a pedal for performing a braking operation, an inching valve that changes a flow rate of a hydraulic fluid, and an adjuster that adjusts a stroke of an operation of the pedal. The adjuster includes a swing member that swings in coordination with an operation of the pedal and that is at a first position when the pedal is at an initial position of the stroke, a movement member that is capable of performing movement in contact with the swing member and that changes the first position by performing the movement in contact with the swing member, and a switching mechanism that is switchable between a first state in which the switching mechanism allows the movement of the movement member and a second state in which the switching mechanism prohibits the movement of the movement member.

8 Claims, 25 Drawing Sheets

(51) Int. Cl.
*E02F 9/22* (2006.01)
*F16J 15/3204* (2016.01)
*G05G 1/40* (2008.04)

(52) U.S. Cl.
CPC ............ *F16J 15/3204* (2013.01); *G05G 1/40* (2013.01); *E02F 9/2253* (2013.01)

(58) Field of Classification Search
CPC ......... B60T 7/06; B60T 11/18; F16J 15/3204; F16J 15/54; F16J 15/56; G05G 1/40; G05G 1/44
See application file for complete search history.

(56) References Cited

FOREIGN PATENT DOCUMENTS

| JP | H089308 | B2 | * | 1/1996 |
| JP | 2002206691 | A | * | 7/2002 |
| JP | 2003252185 | A | * | 9/2003 |
| JP | 2006105268 | A | * | 4/2006 |
| JP | 2007055281 | A | * | 3/2007 |
| JP | 2011116370 | A | * | 6/2011 |
| JP | 2012224213 | A | * | 11/2012 |

OTHER PUBLICATIONS

JP-2011116370-A English Translation (Year: 2011).*
JP-2012224213-A English Translation (Year: 2012).*
JP-2006105268-A English Translation (Year: 2006).*
JP-H089308-B2 English Translation (Year: 1996).*
International Search Report and Written Opinion of the International Searching Authority issued in International Patent Application No. PCT/JP2020/042290, dated Feb. 9, 2020, along with an English translation thereof.

* cited by examiner

WORK MACHINE, SHAFT SEALING STRUCTURE, AND WORK MACHINE INCLUDING THE SEALING STRUCTURE

CROSS REFERENCE TO RELATED APPLICATIONS

This application is a continuation application of International Application No. PCT/JP2020/042290, filed on Nov. 12, 2020, which claims the benefit of priority to Japanese Patent Application No. 2019-206251, filed on Nov. 14, 2019, and to Japanese Patent Application No. 2019-206252, filed on Nov. 14, 2019. The entire contents of each of these applications are hereby incorporated herein by reference.

BACKGROUND OF THE INVENTION

1. Field of the Invention

The present invention relates to a work machine such as a wheel loader. The present invention also relates to a shaft sealing structure and a work machine, such as a wheel loader, including the sealing structure.

2. Description of the Related Art

To date, a work machine disclosed in Japanese Unexamined Patent Application Publication No. 2012-224213 is known.

The work machine disclosed in Japanese Unexamined Patent Application Publication No. 2012-224213 has a hydraulic drive that hydraulically drives a travel device and an inching valve that provides a braking force to the hydraulic drive by discharging, to a hydraulic fluid tank, a working fluid that controls the hydraulic drive in accordance with a pedal depressing operation.

To date, a shaft sealing structure disclosed in Japanese Unexamined Patent Application Publication No. 2002-206691 is also known.

In the shaft sealing structure disclosed in Japanese Unexamined Patent Application Publication No. 2002-206691, a groove is formed in an inner peripheral surface of a tubular member disposed on an outer peripheral side of a shaft, an O-ring is fitted into the groove as a sealing member, and the O-ring is in contact with an outer peripheral surface of the shaft.

SUMMARY OF THE INVENTION

However, in the work machine disclosed in Japanese Unexamined Patent Application Publication No. 2012-224213, it is difficult to adjust and fix the stroke (inching region) of a pedal operation for activating the inching valve in an appropriate range.

In the sealing structure disclosed in Japanese Unexamined Patent Application Publication No. 2002-206691, it is necessary to form the groove, for fitting the O-ring thereinto, in the inner peripheral surface of the tubular member. Moreover, it is not easy to attach the O-ring, because it is necessary to compress the O-ring to fit the O-ring into the groove.

In consideration of the above problem, an object of the present invention is to enable the stroke of a pedal operation for activating an inching valve to be easily adjusted and fixed in any appropriate range (steplessly).

Moreover, in consideration of the above problem, an object of the present invention is to provide a shaft sealing structure that can exhibit high sealing performance and that allows a sealing member to be easily attached.

A work machine according to an aspect of the present invention includes: a machine body; a travel device that supports the machine body so that the machine body is capable of traveling; a hydraulic drive that hydraulically drives the travel device; a pedal for performing a braking operation of the travel device; an inching valve that changes, in response to an operation of the pedal, a flow rate of a hydraulic fluid supplied to the hydraulic drive; and an adjuster that adjusts a stroke of an operation of the pedal. The adjuster includes a swing member that swings in coordination with an operation of the pedal and that is at a first position when the pedal is at an initial position of the stroke, a movement member that is capable of performing movement in contact with the swing member and that changes the first position by performing the movement in contact with the swing member, and a switching mechanism that is switchable between a first state in which the switching mechanism allows the movement of the movement member and a second state in which the switching mechanism prohibits the movement of the movement member.

A shaft sealing structure according to an aspect of the present invention includes a shaft, a cover that has an opening through which the shaft is inserted, and a sealing member that seals between an outer peripheral surface of the shaft and an opening edge of the opening. The shaft is capable of performing movement relative to the cover in an axial direction of the shaft. The sealing member includes an inner edge portion that is in close contact with the outer peripheral surface of the shaft by elastic deformation and an outer edge portion that is attached to the opening edge of the opening. The inner edge portion has a curved-surface shape that bulges toward the outer peripheral surface. A recessed groove into which the opening edge is fitted is formed in the outer edge portion.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 4 is a right side view of a steering column, an adjuster, and the like.

DETAILED DESCRIPTION OF THE PREFERRED EMBODIMENTS

Figure 1:
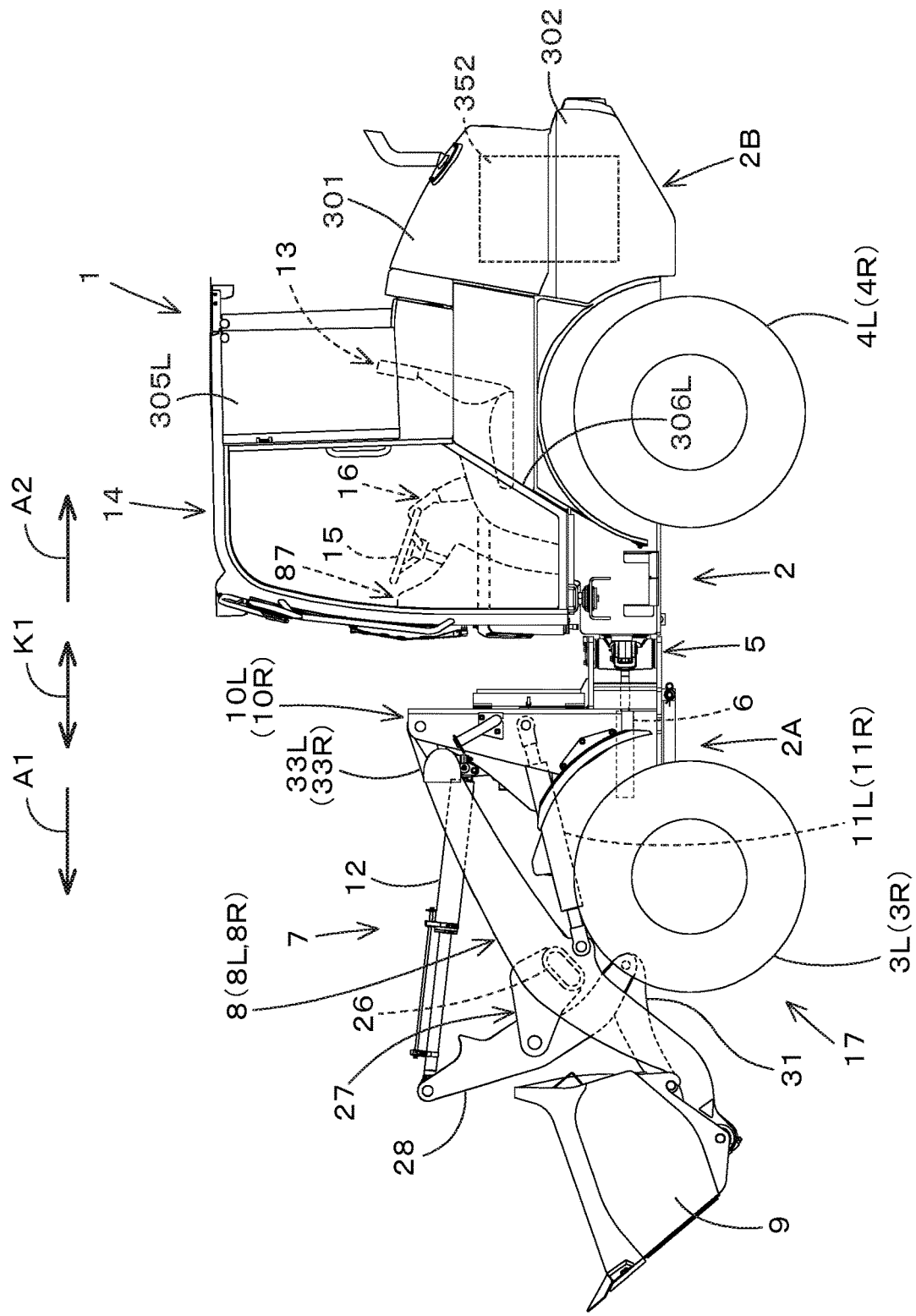
FIG. 1 is a side view of a work machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereafter, an embodiment of the present invention will be described with reference to the drawings.

Figure 2:
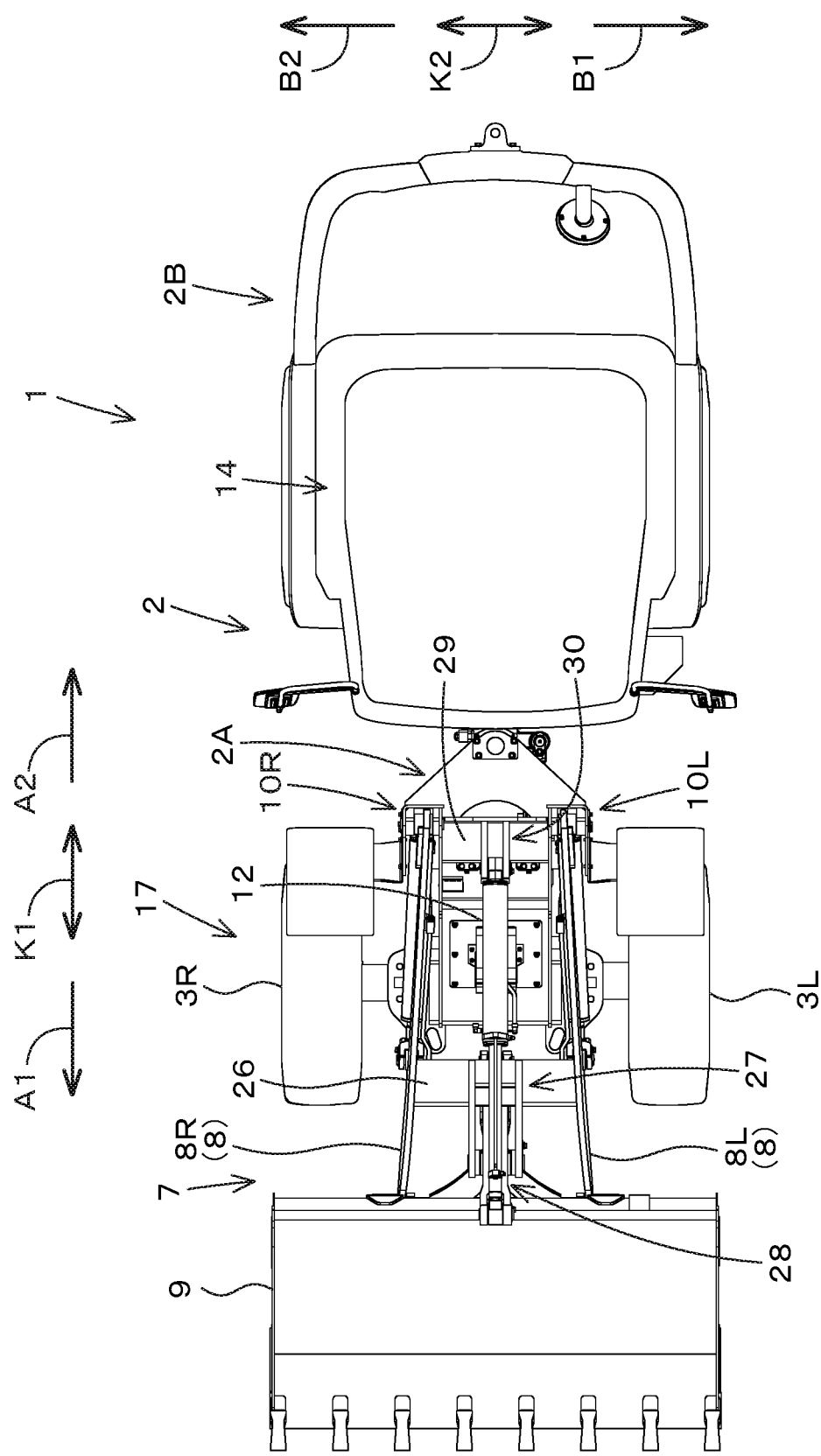
FIG. 2 is a plan view of the work machine.

FIG. 1 is a side view illustrating the overall configuration of a work machine 1 according to the present embodiment. FIG. 2 is a schematic plan view of the work machine 1. In the present embodiment, a wheel loader is described as an example of the work machine 1.

As illustrated in FIGS. 1 and 2, the wheel loader according to the present embodiment is an articulated work machine 1, and a machine body 2 of the work machine 1 includes a front machine body 2A and a back machine body 2B. A left front wheel 3L and a right front wheel 3R are provided on the front machine body 2A. The front wheel 3L is provided on the left side of the front machine body 2A, and the front wheel 3R is provided on the right side of the front machine body 2A. A left back wheel 4L and a right back wheel 4R are provided on the back machine body 2B. The back wheel 4L is provided on the left side of the back machine body 2B, and the back wheel 4R is provided on the right side of the back machine body 2B. The front wheels 3L and 3R and the back wheels 4L and 4R are each a part of a travel device 17 that supports the machine body so that the machine body 2 is capable of traveling. A driver's seat (seat) 13, on which an operator (driver) sits, is mounted on the back machine body 2B. The driver's seat 13 is disposed between the back wheel 4L and the back wheel 4R, and is provided in a central part of the machine body 2 in a machine-body-width direction K2.

In the present embodiment, a forward direction corresponds a forward direction of an operator sitting on the driver's seat 13 (the direction of an arrow A1 in FIGS. 1 and 2), a backward direction corresponds to a backward direction of the operator (the direction of an arrow A2 in FIGS. 1 and 2), a leftward direction corresponds to a leftward direction of the operator (the direction toward the near side of FIG. 1, the direction of an arrow B1 in FIG. 2), and a rightward direction corresponds to a rightward direction of the operator (the direction toward the far side of FIG. 1, the direction of an arrow B2 in FIG. 2). A machine-body-width direction K2 (see FIG. 2) corresponds to a horizontal direction that is perpendicular to a machine-body front-back direction K1. A machine-body-outward direction corresponds to a rightward direction or a leftward direction from a central part of the machine body in the width direction. That is, the machine-body-outward direction is a direction away from the center of the machine body 2 in the machine-body-width direction K2. A machine-body-inward direction corresponds to a direction opposite to the machine-body-outward direction. That is, the machine-body-inward direction is a direction toward the center of the machine body 2 in the machine-body-width direction K2.

As illustrated in FIG. 1, on a front end part of the back machine body 2B, a machine-body coupling member 5 is provided so as to be rotatable in a predetermined range around an axis extending in the machine-body front-back direction K1, and a back end part of the front machine body 2A is coupled to the machine-body coupling member 5 so as to be swingable in the machine-body-width direction K2 around a vertical axis (an axis extending in the up-down direction).

A steering cylinder 6, which is a hydraulic cylinder, is provided in the machine-body coupling member 5 and the front machine body 2A. When the steering cylinder 6 is extended and contracted, the front machine body 2A swings in the machine-body-width direction K2 with respect to the back machine body 2B, and thus the work machine 1 can be steered leftward and rightward.

A cabin 14, which is a driver's-seat protector that surrounds the driver's seat 13, is provided in the back machine body 2B. Inside of the cabin 14, a steering wheel (steering) 15, for operating the steering cylinder 6 that is a part of the travel device 17, and a control lever 16, for controlling a work device 7, are provided. The steering wheel 15 is disposed forward of the driver's seat 13, and the control lever 16 is disposed leftward (rightward) of the driver's seat 13.

As illustrated in FIG. 1, a motor 352 is mounted in the back machine body 2B. The motor 352 is, for example, a diesel engine. The driver's-seat protector may be a canopy instead of the cabin 14.

As illustrated in FIGS. 1 and 2, the work device 7 (front work device) is provided in the front machine body 2A. The work device 7 has a lift arm 8 that is supported by the front machine body 2A (machine body 2) so as to be vertically swingable. The lift arm 8 has a left first arm 8L and a right second arm 8R that are disposed with a distance therebetween in the machine-body-width direction K2. A proximal end part (back end part) of the first arm 8L is supported by an upper part of a first support frame 10L, which stands on the left side of the front machine body 2A, so as to be rotatable around an axis extending in the machine-body-width direction K2. Accordingly, the first arm 8L is vertically swingable. A proximal end part of the second arm 8R is supported by an upper part of a second support frame 10R, which stands on the right side of the front machine body 2A, so as to be rotatable around an axis extending in the machine-body-width direction K2. Accordingly, the second arm 8R is also vertically swingable. A work light (light) 33L is provided on the left side of the upper part of the first support frame 10L. A work light (light) 33R is provided on the right side of the upper part of the second support frame 10R.

As illustrated in FIGS. 1 and 2, the first arm 8L and the second arm 8R are coupled by a coupling pipe 26 that is provided in a middle part of the lift arm 8 in the longitudinal direction.

As illustrated in FIG. 1, a lift cylinder 11L is provided between a middle part of the first arm 8L in the longitudinal direction and a middle part of the first support frame 10L in the up-down direction. A lift cylinder 11R is provided between a middle part of the second arm 8R in the longitudinal direction and a middle part of the second support frame 10R in the up-down direction. The lift cylinder 11L and the lift cylinder 11R each include a double-acting hydraulic cylinder. When the lift cylinder 11L and the lift cylinder 11R are extended and contracted, the lift arm 8 swings (the first arm 8L and the second arm 8R simultaneously swing) vertically.

As illustrated in FIGS. 1 and 2, the work device 7 has a work attachment 9 that is removably attached to a front part of the lift arm 8. The work attachment 9 attached as standard equipment is a bucket. Instead of the bucket, a work attachment (attachment), such as a pallet fork, a manure fork, or the like; or a work attachment having a hydraulic actuator (hydraulic attachment), such as a sweeper, a mower, breaker, or the like, can be attached. A back lower part of the work attachment 9 is coupled to and pivotably supported by a distal end part (front end part) of the lift arm 8.

As illustrated in FIG. 1, the work machine 1 has a work-attachment cylinder 12 that drives the work attachment 9. The work-attachment cylinder 12 includes a double-acting hydraulic cylinder. A bracket member 27 is fixed to the coupling pipe 26, and a middle part of a swing link 28 in the up-down direction is pivotably supported by the bracket member 27. One end of the work-attachment cylinder 12 is coupled to an upper part of the swing link 28. The other end of the work-attachment cylinder 12 is pivotably supported by a bracket member 30 that is provided on a coupling member 29 that couples the first support frame 10L and the second support frame 10R (see FIG. 2). A back part of an interlocking link 31 is pivotably supported by a lower part of the swing link 28. A front part of the interlocking link 31 is pivotably supported (engaged with) by a back upper part of the work attachment 9. When the work-attachment cylinder 12 is extended and contracted, the swing link 28 swings and the interlocking link 31 moves forward and backward. Thus, the work attachment 9 swings vertically around a coupling point with the lift arm 8.

The front wheel 3L is provided further forward than the first support frame 10L and further leftward than the first arm 8L. The front wheel 3L is positioned backward of a left part of the work attachment 9. The front wheel 3R is provided further forward than the second support frame 10R and further rightward than the second arm 8R. The front wheel 3R is positioned backward of a right part of the work attachment 9.

As illustrated in FIG. 1, a bonnet 301, which covers the motor 352 from above, and a weight 302, which is disposed below the bonnet 301, are provided in a back part of the machine body 2.

As illustrated in FIG. 1, a steering column 87, which supports the steering wheel 15, is provided in a front part of the inside of the cabin 14. The steering column 87 is positioned in a central part of the inside of the cabin 14 in the machine-body-width direction K2.

Figure 3:
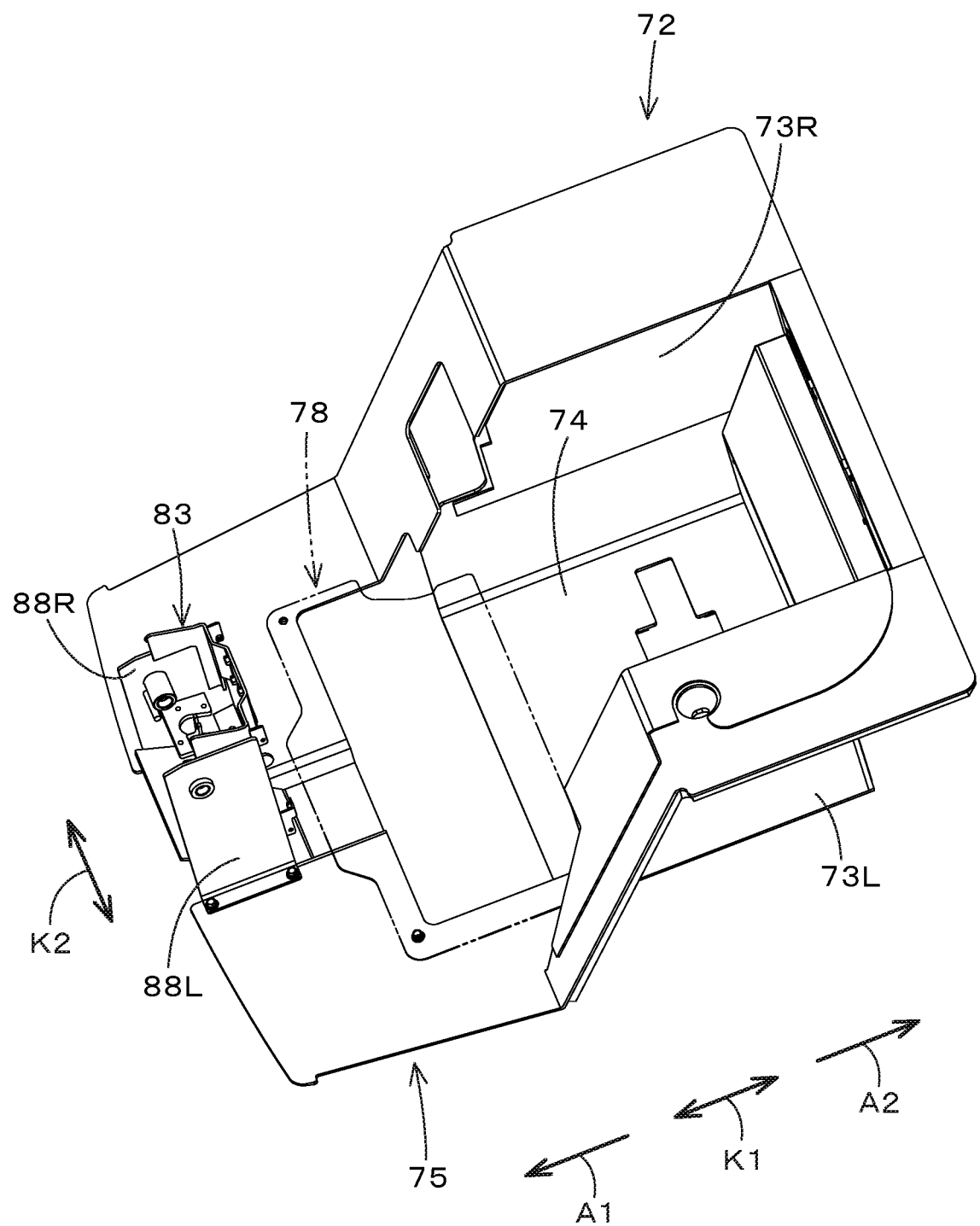
FIG. 3 is a back top perspective view of a floor frame.

The steering column 87 has a column frame (frame member) 88 illustrated in FIG. 3. As illustrated in FIG. 3, the column frame 88 stands on a front part of a floor frame 72 that forms a lower part of the cabin 14. The floor frame 72 has a left first side wall 73L and a right second side wall 73R. A bottom wall 74 is provided between a lower part of the first side wall 73L and a lower part of the second side wall 73R. The floor frame 72 has a floor portion (step) 75 that is provided on the front side of the bottom wall 74. The bottom wall 74 is positioned below the floor portion 75. Accordingly, a space is formed between a front end part of the bottom wall 74 and a back end part of the floor portion 75. A rubber mat 332 is laid on the floor portion 75 (see FIGS. 4 to 6).

As illustrated in FIG. 3, the column frame 88 is provided in a central part, in the machine-body-width direction K2, of a front part of the floor frame 72. The column frame 88 has a first side wall 88L and a second side wall 88R that are disposed with a distance therebetween in the machine-body-width direction K2. The first side wall 88L forms a left part of the column frame 88 and stands on the floor portion 75. The second side wall 88R forms a right part of the column frame 88 and stands on the floor portion 75.

Figure 6:
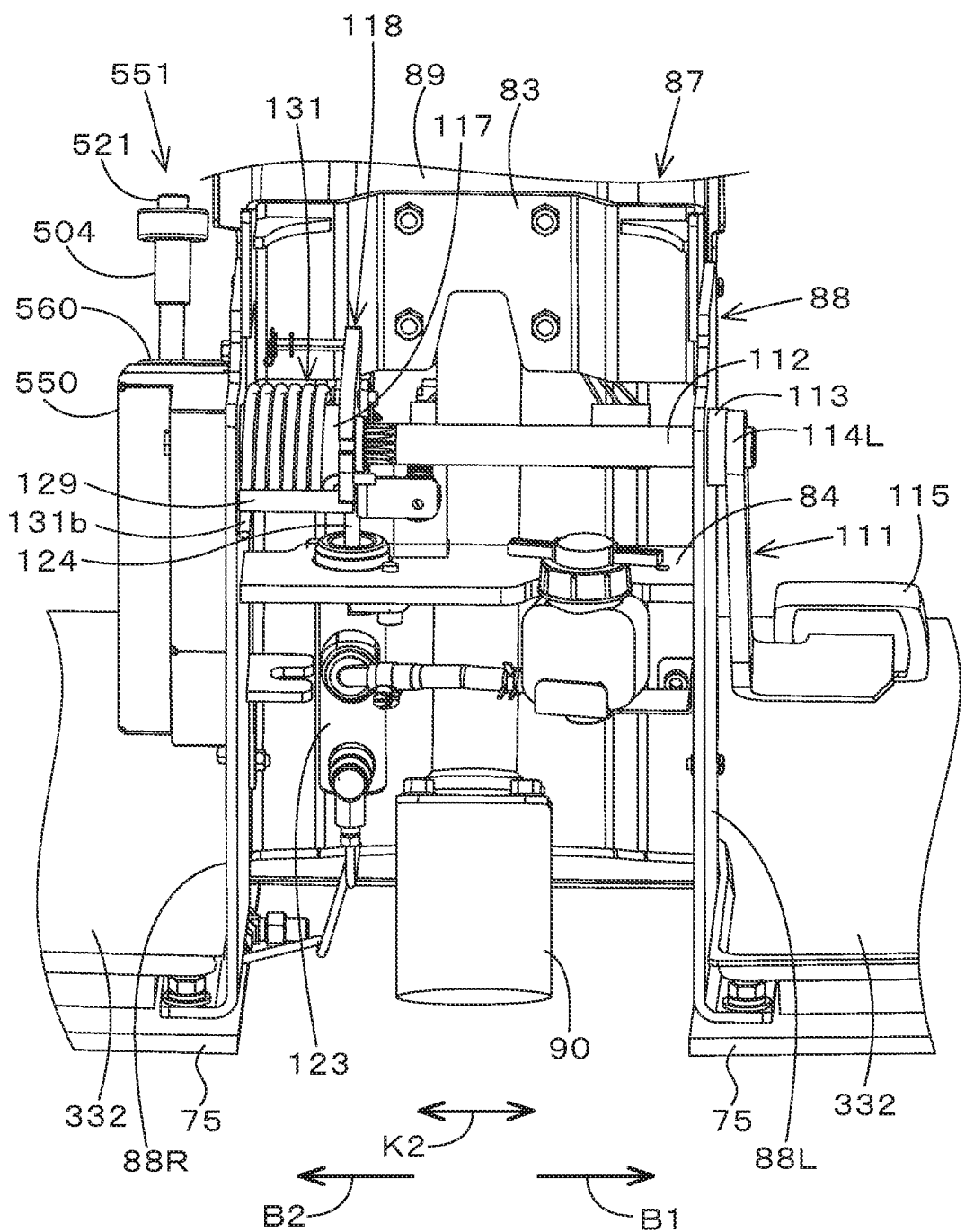
FIG. 6 is a front view of the steering column, the adjuster, the brake pedal, and the like (as seen from a side opposite to the driver's seat side).

As illustrated in FIG. 6, the column frame 88 has a first coupling member 83 and a second coupling member 84. The first coupling member 83 couples an upper part of the first side wall 88L and an upper part of the second side wall 88R to each other. The second coupling member 84 couples a middle part of the first side wall 88L in the up-down direction and a middle part of the second side wall 88R in the up-down direction to each other. A steering valve 90, which controls the steering cylinder 6, is disposed below the second coupling member 84.

Figure 4:
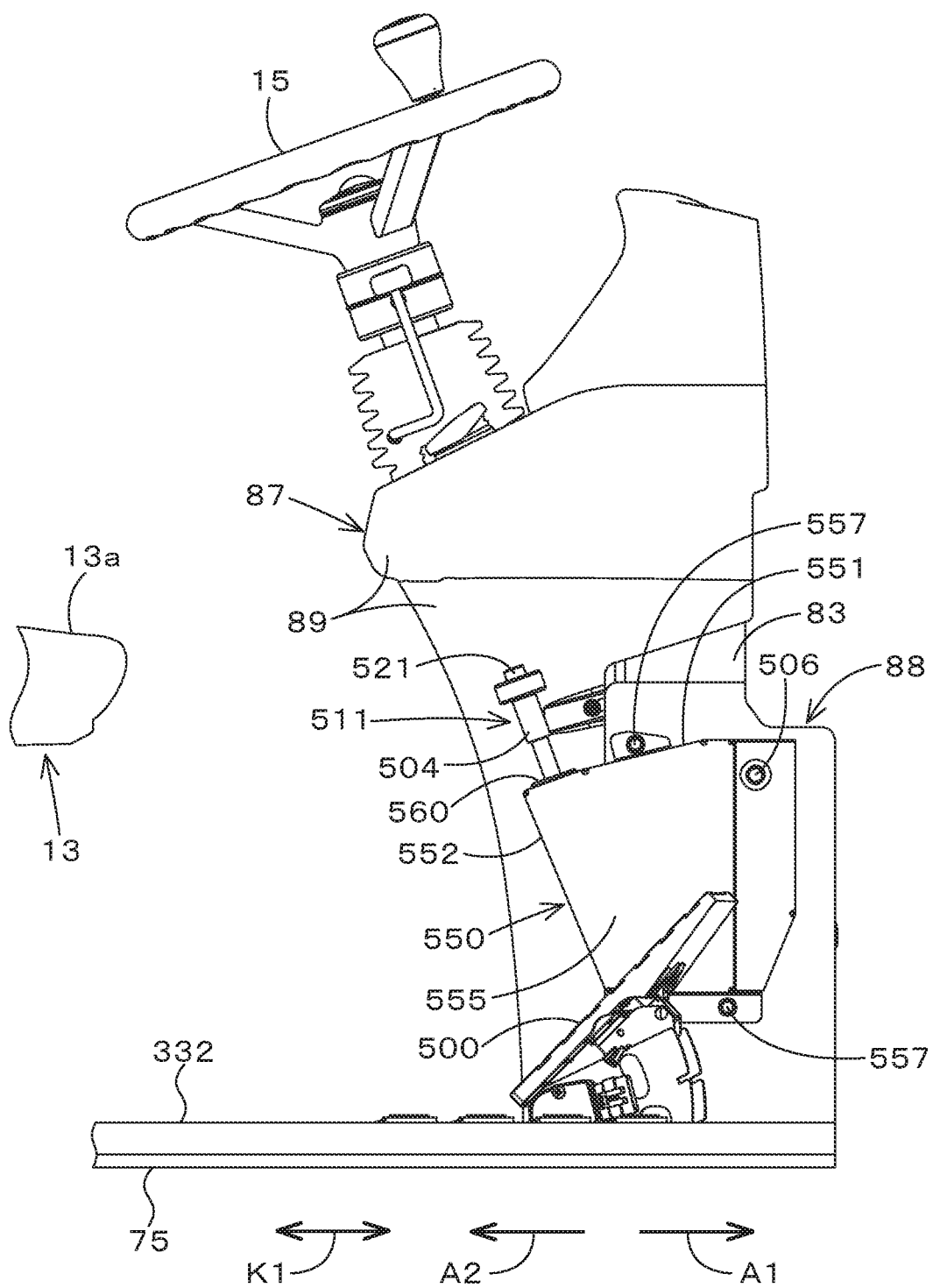
Figure 5:
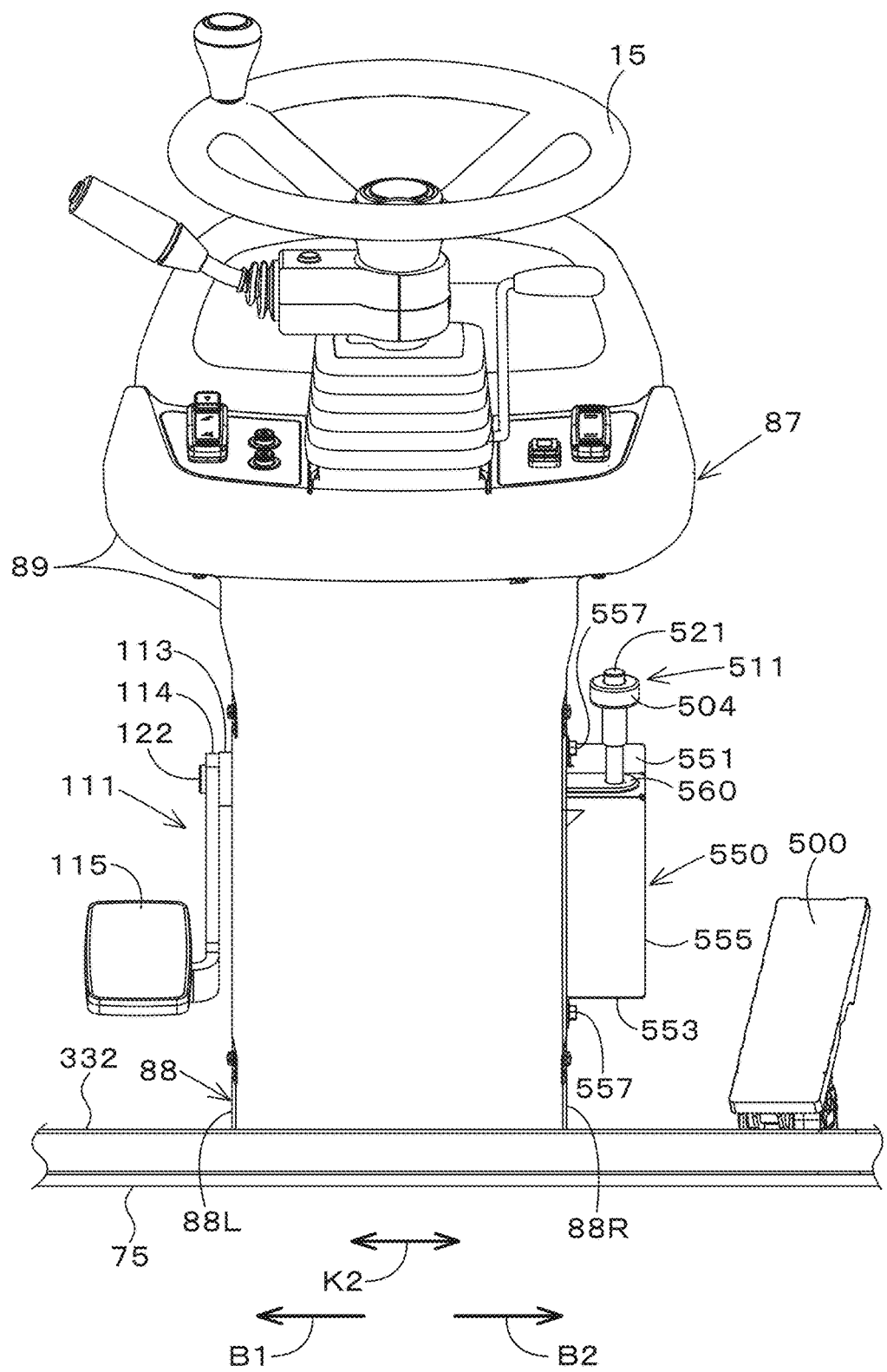
FIG. 5 is back view of the steering column, the adjuster, a brake pedal, and the like (as seen from the driver's seat side).

As illustrated in FIGS. 4 to 6, the steering column 87 has a column cover 89 that covers the column frame 88. The column cover 89 covers the front side and the upper side of the column frame 88.

As illustrated in FIG. 6, a brake pedal 111 is disposed leftward of the column frame 88. A brake shaft 112, which has an axis extending in the machine-body-width direction K2, is provided on an upper part of the column frame 88. The brake shaft 112 is formed of a single bar, extends through upper front parts of the first side wall 88L and the second side wall 88R, and is supported by the side walls 88L and 88R so as to be rotatable around the axis.

A left part of the brake shaft 112 protrudes leftward from a bearing boss 113 that is fixed to the outer side of the first side wall 88L. An upper part 114L of the brake pedal 111 is fixed to this protruding part. Accordingly, the brake pedal 111 rotates integrally with the brake shaft 112. A depressing portion 115, which an operator depresses, is provided in a lower part of the brake pedal 111. That is, the brake pedal 111 is a suspended brake pedal.

Figure 7:
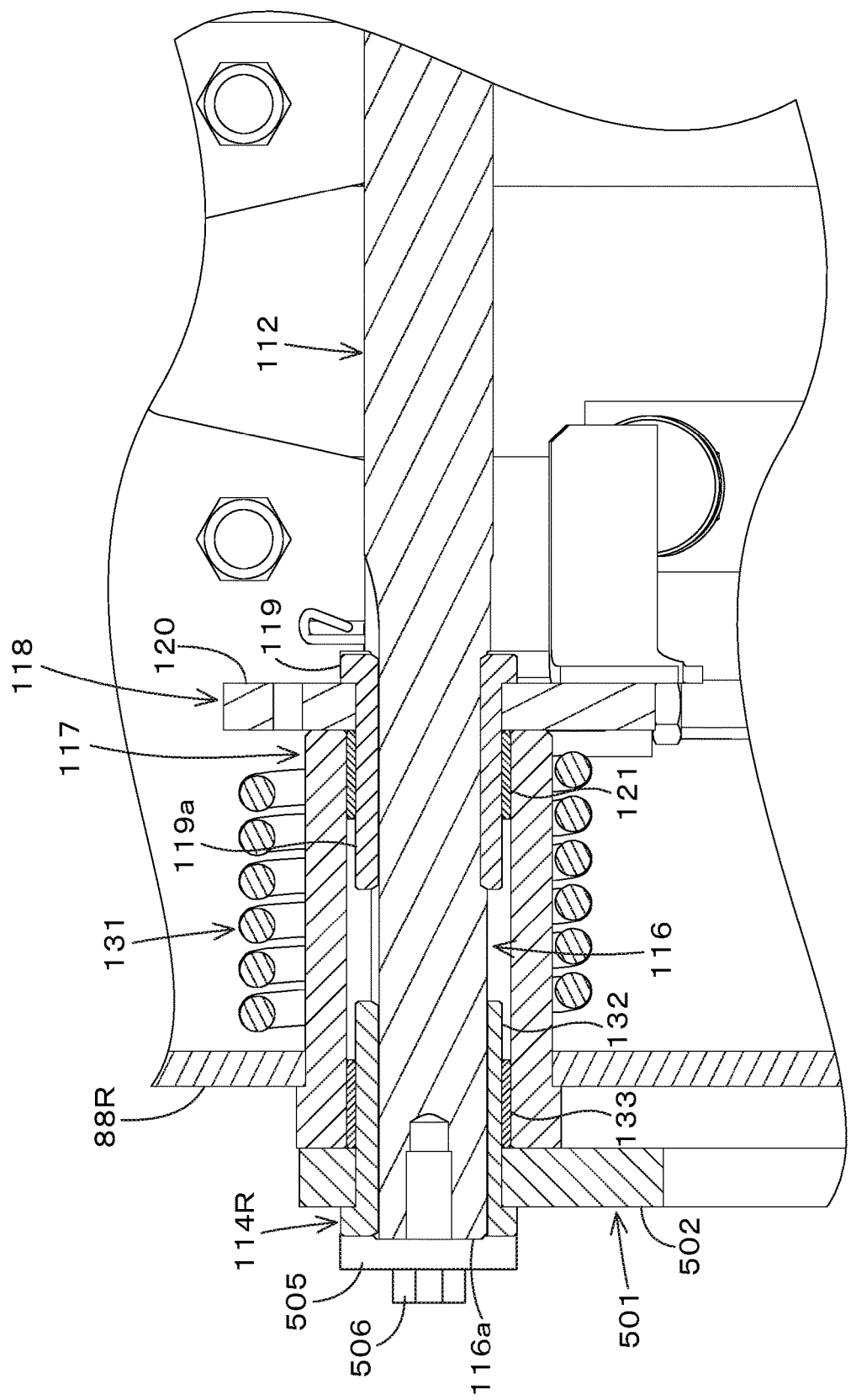
FIG. 7 is a sectional view of a brake-pedal supporting structure.
Figure 8:
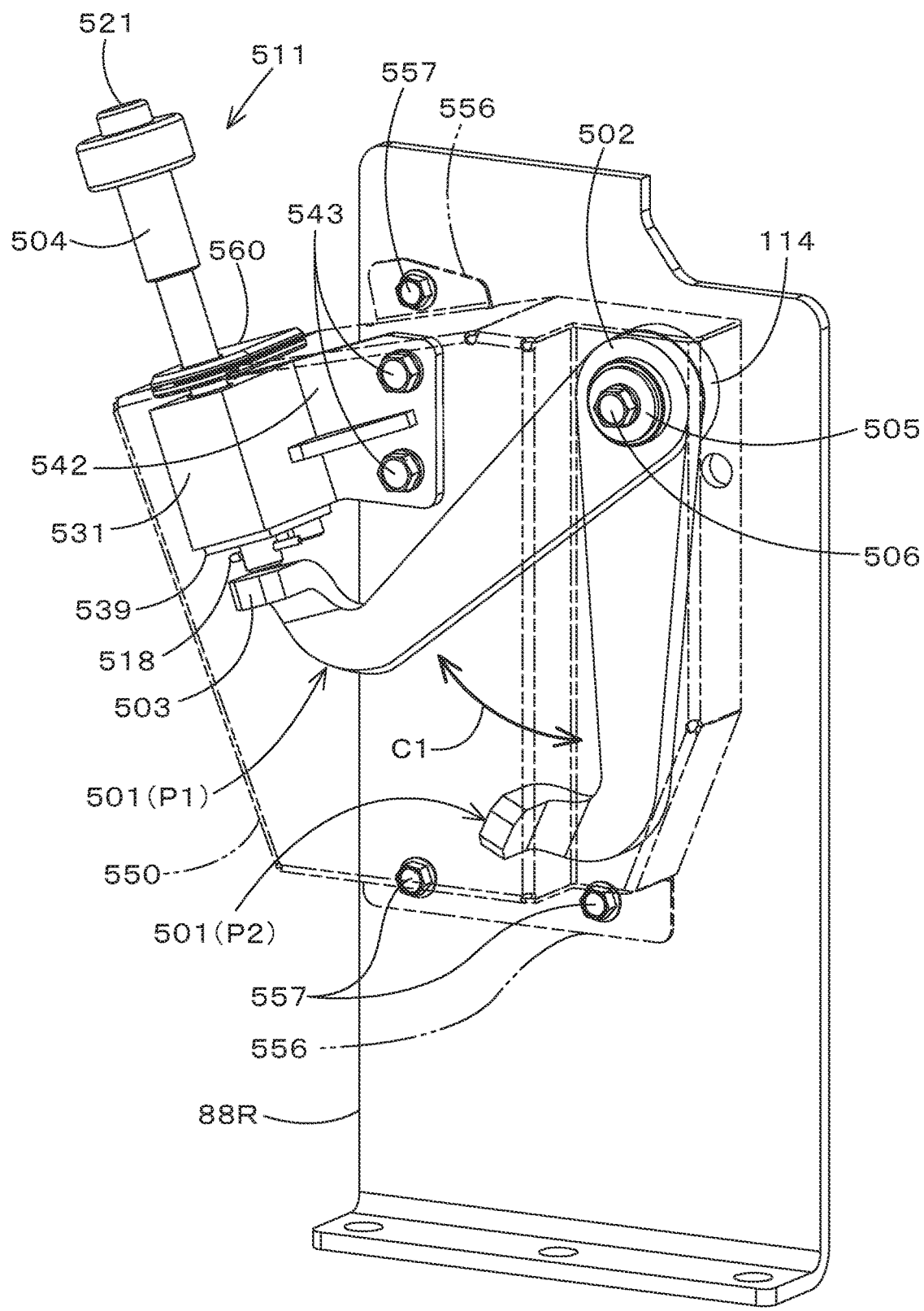
FIG. 8 illustrates a state in which a swing member is at a first position and a state in which the swing member is at a second position.

As illustrated in FIG. 7, a right part of the brake shaft 112 protrudes in the machine-body-outward direction from the second side wall 88R. A swing member 501, which swings in coordination with the brake pedal 111, is attached to the right part of the brake shaft 112. As illustrated in FIG. 8, the swing member 501 has an attachment portion 502, which is attached to the right part of the brake shaft 112, at a proximal end part thereof, and has a contact portion 503, with which a movement member 504 described below is in contact, at a distal end part thereof. In accordance of an operation of the brake pedal 111, the swing member 501 rotates integrally with the brake shaft 112 and thus swings around the central axis of the brake shaft 112 (see an arrow C1 in FIG. 8). To be specific, as illustrated in FIG. 8, the swing member 501 swings between a first position P1 and a second position P2 in accordance of an operation of the brake pedal 111.

It is possible to change the position of the brake pedal 111 by swinging and changing the position of the swing member 501.

As illustrated in FIG. 7, the brake shaft 112 has a joint portion 116 formed of splines. The joint portion 116 is formed to the right end of the brake shaft 112. A bearing tube 117, which supports the brake shaft 112, is fixed to an inner upper part of the second side wall 88R. The bearing tube 117 extends through the second side wall 88R and protrudes in the machine-body-inward direction from the second side wall 88R. Both ends of the bearing tube 117 in the axial direction are open, and the joint portion 116 is inserted through the bearing tube 117. The joint portion 116 protrudes from a left end part of the bearing tube 117. A brake arm 118 is disposed leftward of the bearing tube 117. The brake arm 118 has an arm boss 119, which is fitted to the joint portion 116, and an arm portion 120, which is fixed to the arm boss 119. The arm boss 119 is spline-joined to the joint portion 116 and rotates integrally with the brake shaft 112. The arm boss 119 has a bearing portion 119a, which is inserted into the bearing tube 117. The brake shaft 112 is supported by the bearing tube 117 via the bearing portion 119a and a bush 121.

As illustrated in FIG. 7, the joint portion 116 has a protruding member 116a, which protrudes from a right end part of the bearing tube 117 in the machine-body-outward direction (a sideward direction away from the side on which the brake pedal 111 is disposed). A boss 114R, which is provided on an upper part of the swing member 501, is attached to the protruding member 116a. The boss 114R is fitted and spline-joined to the protruding member 116a from the rightward direction, and thus the boss 114R rotates integrally with the brake shaft 112. The boss 114R has a shaft-supporting portion 132 inserted into the bearing tube 117. A bush 133, which is provided on an inner peripheral side of the bearing tube 117, is fitted to an outer periphery of the shaft-supporting portion 132. The brake shaft 112 is supported by the bearing tube 117 via the shaft-supporting portion 132 and the bush 133.

Figure 9:
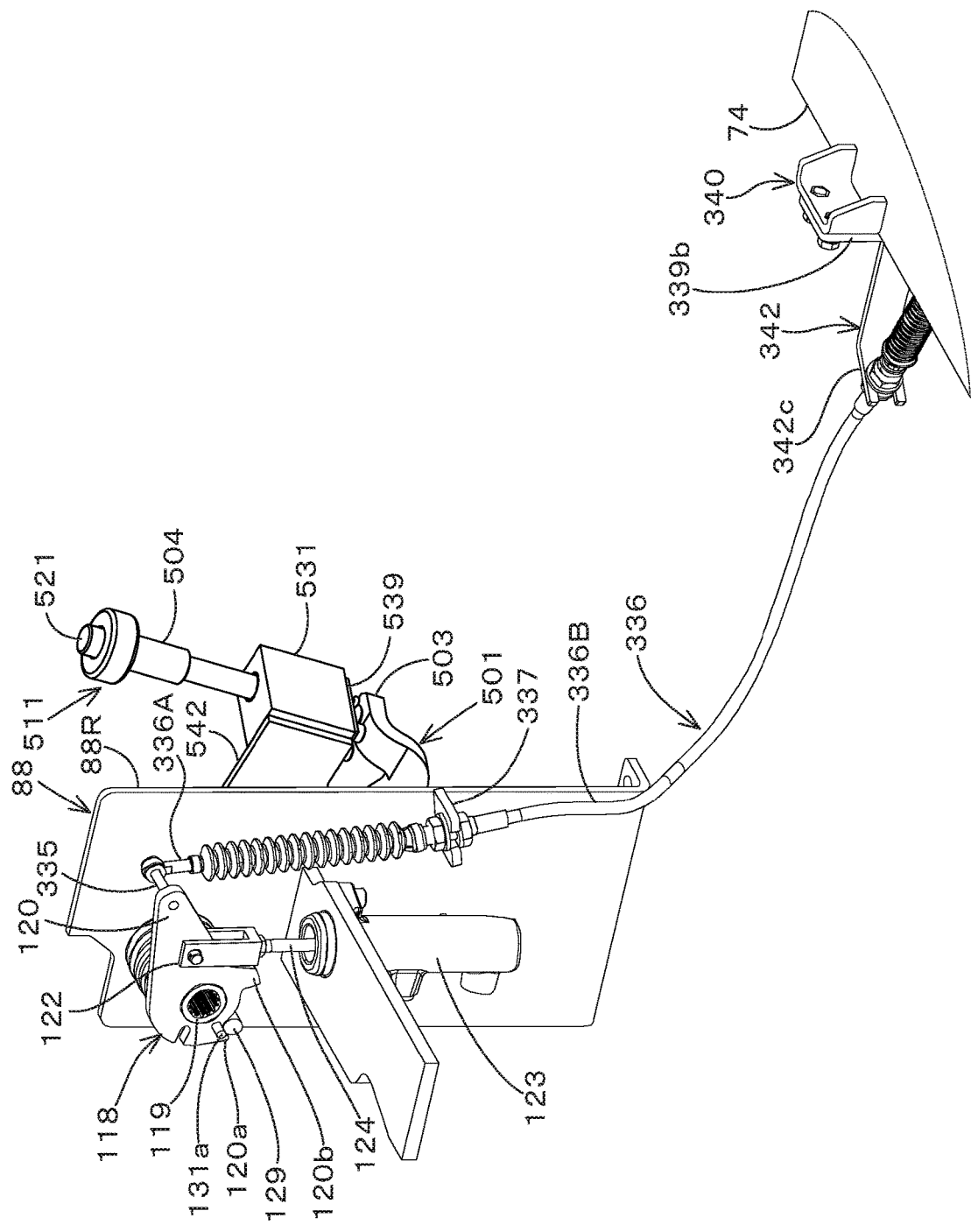
FIG. 9 is a perspective view illustrating the relationship between a brake arm and a cable.

As illustrated in FIG. 7, a press plate 505 is fixed to a right end part of the brake shaft 112 by using a fastener (bolt) 506. The press plate 505 is in contact with a right end surface of the brake shaft 112 and a right end surface of the boss 114R. As illustrated in FIG. 9, one end of a coupling link 122 is pivotably supported by a back part of the arm portion 120, and the other end of the coupling link 122 is coupled to an upper part of a piston rod 124 of a master cylinder 123. Accordingly, when the brake pedal 111 is depressed, in accordance with rotation of the brake shaft 112, the back part of the brake arm 118 swings downward and the piston rod 124 is pushed into the master cylinder 123 via the coupling link 122. Thus, the master cylinder 123 is activated, and a brake device (not shown) is activated.

As illustrated in FIG. 9, a first contact portion 120a and a second contact portion 120b are provided in the arm portion 120. A restriction rod 129 is provided between the first contact portion 120a and the second contact portion 120b. As illustrated in FIG. 6, the restriction rod 129 is fixed to the second side wall 88R so as to protrude in the machine-body-inward direction. When the first contact portion 120a is in contact with the restriction rod 129, swing of the brake pedal 111 in a direction (anti-depression direction) opposite to the depressing direction is restricted. The position of the brake pedal 111 in the state in which the restriction rod 129 is in contact with the first contact portion 120a is a pre-depression position. When the second contact portion 120b is in contact with the restriction rod 129, swing of the brake pedal 111 in the depression direction is restricted.

The stroke of the operation of the brake pedal 111 is defined in a range between a position restricted by the first contact portion 120a and a position restricted by the second contact portion 120b. That is, the position of the brake pedal 111 restricted by the first contact portion 120a is the initial position of the stroke of the brake pedal 111. The position of the brake pedal 111 restricted by the second contact portion 120b is the terminal position of the stroke of the brake pedal 111.

When the brake pedal 111 is at the initial position of the stroke, the swing member 501 is at the first position P1 (see FIG. 8). When the brake pedal 111 is at the terminal position of the stroke, the swing member 501 is at the second position P2 (see FIG. 8).

However, it is possible to change the first position P1 by using an adjuster 511 described below, and it is possible to adjust the initial position of the stroke of the brake pedal 111 by changing the first position P1. The adjustable range is a range between the position restricted by the first contact portion 120a and the position restricted by the second contact portion 120b.

As illustrated in FIG. 6, a return spring 131, which returns the brake pedal 111 to a position before the brake pedal 111 is operated (a set position during an unoperated period) is disposed in a right-side part between the first side wall 88L and the second side wall 88R. The return spring 131 includes a torsion coil spring, and is provided so as to surround the brake shaft 112. In the present embodiment, the return spring 131 is provided so as to surround the outer periphery of the bearing tube 117. One end 131a (left end part) of the return spring 131 is latched to the brake arm 118 (see FIG. 9). The other end 131b (right end part) of the return spring 131 is latched to the restriction rod 129. Thus, the return spring 131 urges the brake pedal 111 in the anti-depression direction.

As illustrated in FIG. 9, a coupling rod 335 is fixed to a distal end part of the arm portion 120 so as to protrude in the machine-body-outward direction. One end of a cable 336 is pivotably coupled to one end part (end part in the machine-body-outward direction) of the coupling rod 335. To be specific, the cable 336 has an inner cable 336A and an outer cable 336B, and one end of the inner cable 336A is coupled to the coupling rod 335. A first cable stay 337 is fixed to a surface of the second side wall 88R facing in the machine-body-inward direction. The first cable stay 337 is provided on a back lower part of the second side wall 88R. One end part of the cable 336 is attached to the first cable stay 337. To be specific, the outer cable 336B is attached to the first cable stay 337.

Figure 10:
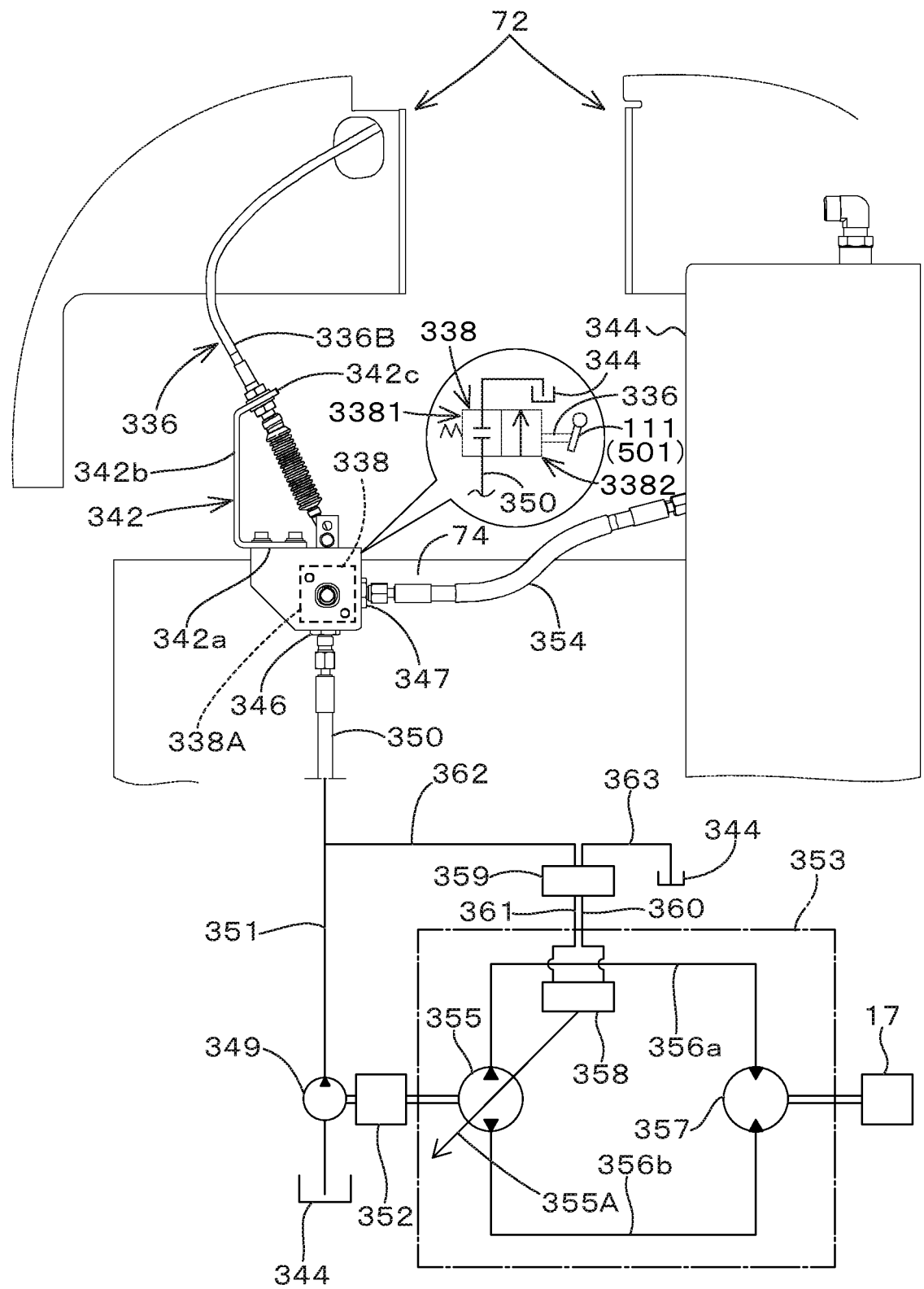
FIG. 10 is a block diagram illustrating an attachment portion of an inching valve and a travel-system hydraulic circuit.

The cable 336 is a cable that couples the brake arm 118 (the brake pedal 111) and an inching valve (valve) 338 so that the brake arm 118 and the inching valve 338 can move in coordination with each other (see FIGS. 9 and 10).

Figure 11:
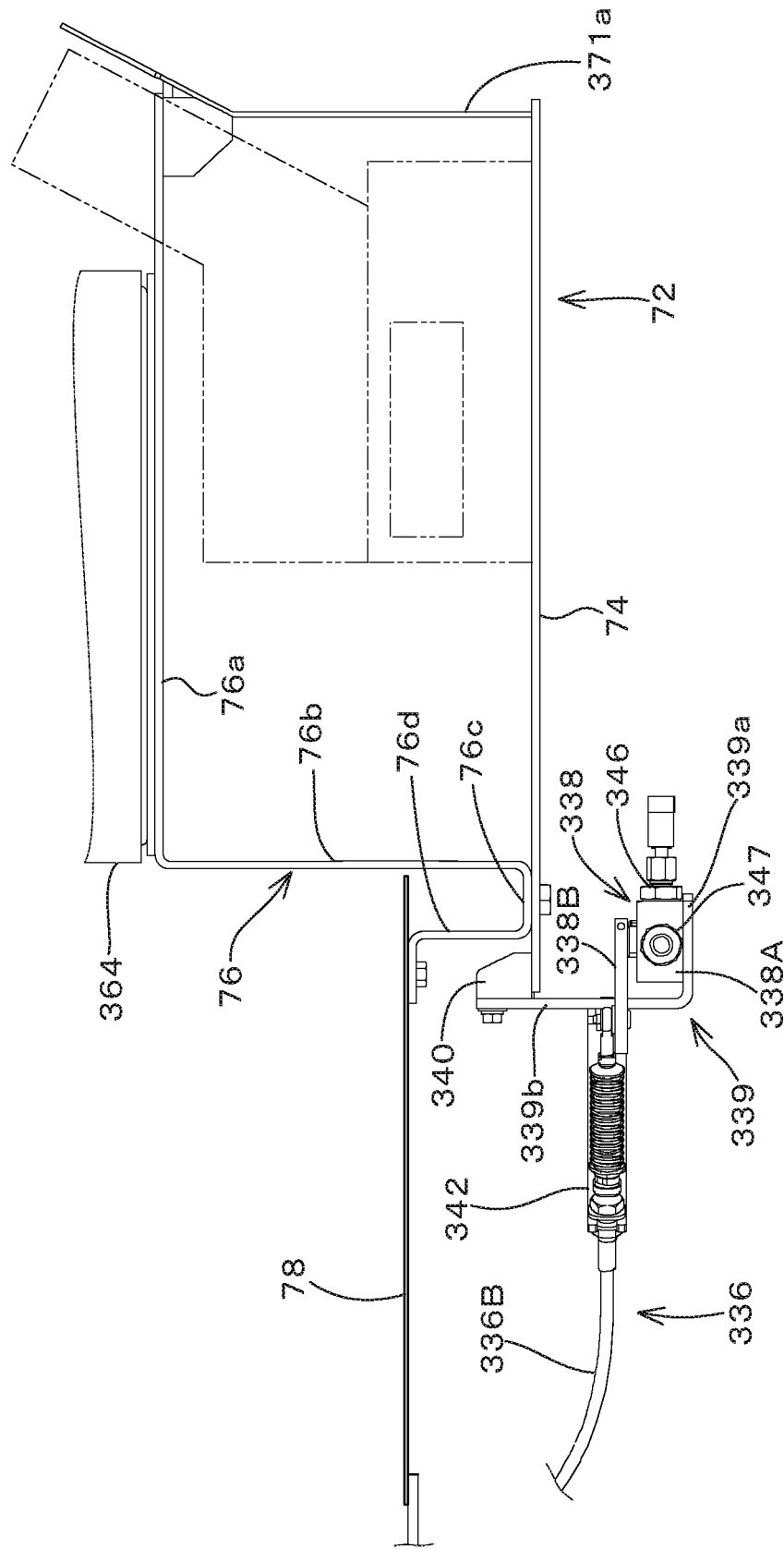
FIG. 11 is a side view of the attachment portion of the inching valve.

As illustrated in FIG. 11, the inching valve 338 is disposed at a position that is adjacent to and below the front end part of the bottom wall 74 of the floor frame 72. The inching valve 338 is attached to the bottom wall 74 at a position below the driver's seat 13. FIG. 10 is a bottom view of the floor frame 72. As illustrated in FIG. 10, the inching valve 338 is disposed on a right part of the bottom wall 74.

Figure 12:
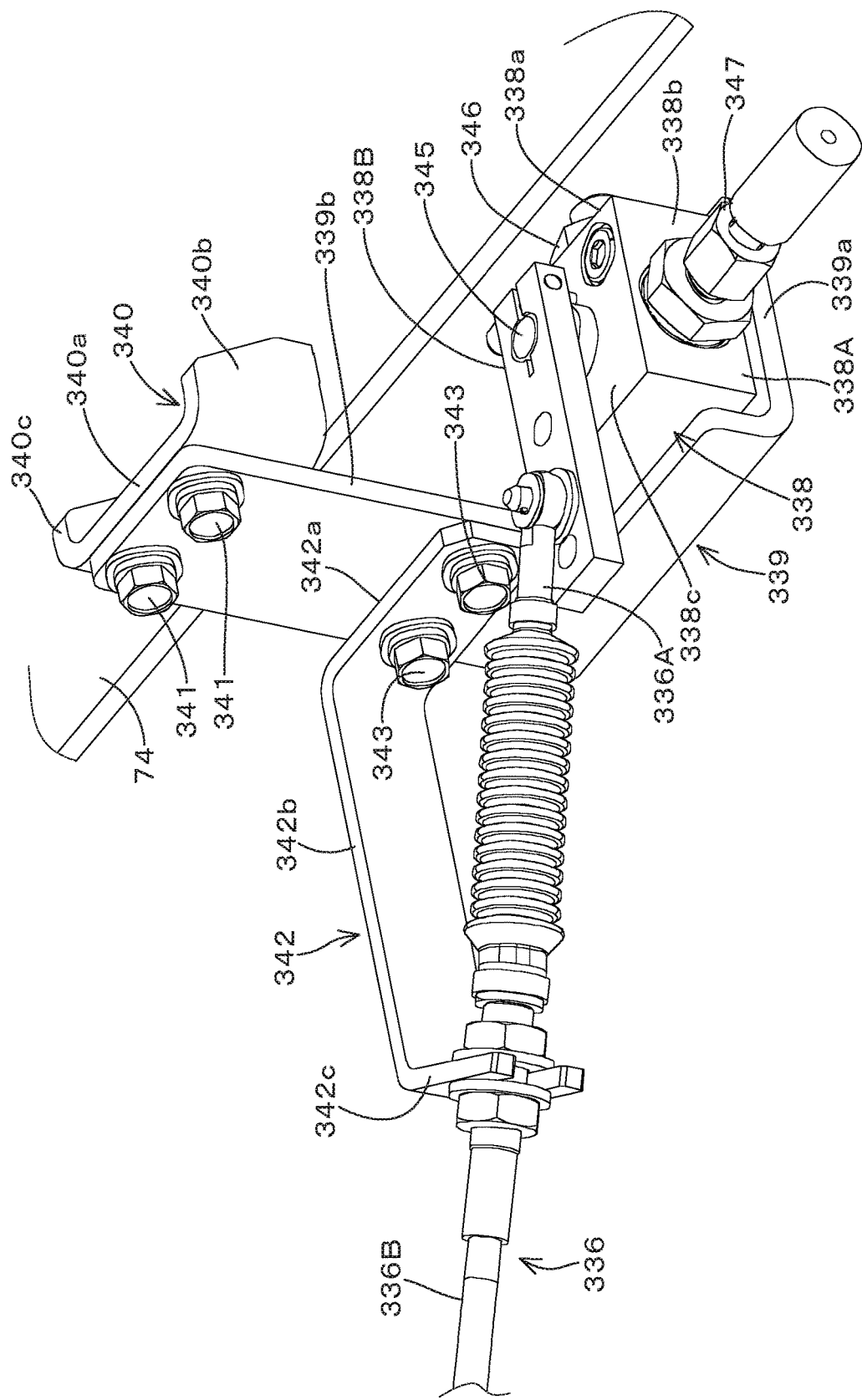
FIG. 12 is a perspective view of the attachment portion of the inching valve.

As illustrated in FIG. 12, the inching valve 338 is attached to a valve bracket 339, and the valve bracket 339 is attached to an attachment bracket 340 that is fixed to the bottom wall 74. The valve bracket 339 has a valve attachment portion 339a, to which the inching valve 338 is attached, and a bracket attachment portion 339b, which extends upward from the valve attachment portion 339a. The attachment bracket 340 is fixed to an upper surface of the bottom wall 74 so that a front end part thereof protrudes slightly from the front end of the bottom wall 74. The attachment bracket 340 has an attachment wall 340a, which stands on the bottom wall 74 so that an attachment surface (front surface) thereof faces forward, a first side wall 340b, which extends backward from one end part of the attachment wall 340a in the machine-body-width direction K2, and a second side wall 340c, which extends backward from the other end part of the attachment wall 340a in the machine-body-width direction K2. An upper part of the bracket attachment portion 339b is superposed on and attached to the front surface of the attachment wall 340a by using a bolt 341.

As illustrated in FIG. 12, a second cable stay 342, to which the other end part of the cable 336 is attached, is attached to the bracket attachment portion 339b. The second cable stay 342 has a first wall portion 342a, a second wall portion 342b, and a third wall portion 342c. The first wall portion 342a is superposed on and fixed to the front surface of the bracket attachment portion 339b by using a bolt 343. The second wall portion 342b extends forward from an end part of the first wall portion 342a in the machine-body-outward direction. The third wall portion 342c extends from the second wall portion 342b in the machine-body-inward direction. To be specific, the third wall portion 342c extends in an inclined direction such that the third wall portion 342c shifts forward in the machine-body-inward direction. The outer cable 336B is attached to the third wall portion 342c.

As illustrated in FIG. 12, the inching valve 338 has a valve body 338A, which has a rectangular block shape, and a valve lever 338B, which operates the valve body 338A. The valve body 338A is horizontally attached to the valve bracket 339. The valve body 338A has a first connection portion 346 on a back surface 338a, a second connection portion 347 on one side surface (left side surface) 338b, and an operation shaft 345 on an upper surface 338c.

As illustrated in FIG. 10, the first connection portion 346 is connected to a discharge circuit 351 of a hydraulic pump 349 via a hydraulic hose (first hydraulic hose) 350. The hydraulic pump 349 is, for example, a fixed displacement pump, and is coupled to a side part of the motor 352 and driven by the driving power of the motor 352. The hydraulic pump 349 discharges a hydraulic fluid stored in a hydraulic fluid tank (tank) 344. To be specific, the hydraulic pump 349 discharges a hydraulic fluid (pilot fluid) that hydraulically controls a hydraulic drive 353. The hydraulic fluid tank 344 is disposed leftward (sideward on a side on which the second connection portion 347 is provided) of the inching valve 338. The second connection portion 347 is connected to the hydraulic fluid tank 344 via a hydraulic hose (second hydraulic hose) 354.

The hydraulic drive 353 includes, for example, a hydrostatic transmission (HST), and hydraulically drives the travel device 17. To be specific, the hydraulic drive 353 according to the present embodiment has an HST pump 355, which is a swash-plate variable displacement-pump that is driven by the driving power of the motor 352, and an HST motor 357, which has a closed-circuit connection with the HST pump 355 via a pair of fluid passages 356a and 356b and which drives the travel device 17 by being driven by a hydraulic fluid discharged from the HST pump 355.

The HST pump 355 can change the direction of a hydraulic fluid discharged therefrom by swinging a swash plate 355A from a neutral position toward one side and toward the other side. When a hydraulic fluid is discharged from the HST pump 355 to the fluid passage 356a or to the fluid passage 356b, the rotation direction of the HST motor 357 is switched, and the HST motor 357 outputs forward-driving power or reverse-driving power to the travel device 17.

The hydraulic drive 353 has a servo cylinder 358 that sets the angle of the swash plate 355A of the HST pump 355. The servo cylinder 358 is connected to a forward-reverse-drive switching valve 359 via a forward-drive fluid passage 360 and a reverse-drive fluid passage 361. The forward-reverse-drive switching valve 359 is connected to the discharge circuit 351 of the hydraulic pump 349 via a supply fluid passage 362, and is connected to the hydraulic fluid tank 344 via a tank fluid passage 363.

The servo cylinder 358 swings the swash plate 355A toward the forward-drive side when a pilot fluid is supplied from the forward-reverse-drive switching valve 359 to the forward-drive fluid passage 360, swings the swash plate 355A toward the reverse-drive side when the pilot fluid is supplied from the forward-reverse-drive switching valve 359 to the reverse-drive fluid passage 361, and holds the swash plate 355A at the neutral position when the pilot fluid is not supplied to the forward-drive fluid passage 360 and the reverse-drive fluid passage 361.

The valve body 338A (the inching valve 338) is formed of a rotary valve, and the operation shaft 345 is integrally formed with (or independently formed and coupled to) a rotary spool of the valve body 338A. The operation shaft 345 is rotatable around a vertical axis, and the inching valve 338 is switched between an off-state (closed state) and an on-state (open state) because the operation shaft 345 rotates around the vertical axis. When the inching valve 338 is in the off-state (closed state), the rotary spool of the valve body 338A is at a first position 3381 (see FIG. 10). When the inching valve 338 is in the on-state (open state), the rotary spool of the valve body 338A is at a second position 3382 (see FIG. 10).

When the inching valve 338 is switched to the off-state, a connection fluid passage that connects the first connection portion 346 and the second connection portion 347 is closed. Thus, it becomes possible to supply a pilot fluid discharged from the hydraulic pump 349 to the forward-reverse-drive switching valve 359, and the swash plate 355A swings toward the forward-drive side or the reverse-drive side in response to switching of the forward-reverse-drive switching valve 359. When the inching valve 338 is switched to the on-state (open state), the connection fluid passage that connects the first connection portion 346 and the second connection portion 347 is opened. Thus, a pilot fluid discharged from the hydraulic pump 349 is drained to the hydraulic fluid tank 344, and is not supplied to the forwardreverse-drive switching valve 359. At this time, if the swash plate 355A has swung to the forward-drive side or the reverse-drive side, the swash plate 355A moves to the neutral side, and the travel device 17 decelerates or stops. Note that it is possible to adjust deceleration of the travel device 17 by using the inching valve 338, because the valve opening degree of the inching valve 338 changes in accordance with the rotation angle of the operation shaft 345 (because the amount of the pilot fluid drained to the hydraulic fluid tank 344 changes).

As illustrated in FIG. 12, one end part of the valve lever 338B is fixed to the operation shaft 345. Accordingly, the valve lever 338B is rotatable around a vertical axis (the axis of the operation shaft 345) together with the operation shaft 345. The other end part of the cable 336 is coupled the other end part of the valve lever 338B. To be specific, the other end part of the inner cable 336A is coupled to the other end part of the valve lever 338B. Accordingly, the inching valve 338 moves in coordination with the brake pedal (pedal) 111 via the cable 336.

In a state in which the brake pedal 111 is not depressed, as illustrated in FIG. 12, the valve lever 338B is in a state of protruding forward from the operation shaft 345, and, in this state, the inching valve 338 is in the off-state.

When the brake pedal 111 is depressed, the brake arm 118 (the arm portion 120) swings downward, and the cable 336 (the inner cable 336A) is pushed. Then, the valve lever 338B is pushed by the cable 336 and rotated together with the operation shaft 345 around a vertical axis. That is, when the brake pedal 111 is depressed, the valve lever 338B swings leftward around the vertical axis (the axis of the operation shaft 345) and rotates the operation shaft 345. Thus, the inching valve 338 enters the on-state and the swash plate 355A returns to the neutral, and driving power is stopped to be output from the hydraulic drive 353 to the travel device 17. Accordingly, when the brake pedal 111 is depressed, the brake device is activated, the travel device 17 is stopped, and the hydraulic drive 353 enters a neutral state.

As illustrated in FIG. 11, a seat base 76 is attached to the bottom wall 74, and the driver's seat 13 is attached to the seat base 76. To be specific, the driver's seat 13 is attached to a suspension device 364, which is attached to the seat base 76. The seat base 76 has an upper wall 76a and a front wall 76b, which extends downward from the front end of the upper wall 76a. An attachment wall 76c extends from the lower end of the front wall 76b, and the attachment wall 76c is fixed to a front part of the bottom wall 74. The seat base 76 has a support leg 76d, to which an openable-closable cover 78 is attached. To be specific, the support leg 76d extends upward from the front end of the attachment wall 76c, and an upper part of the support leg 76d is bent forward. A back part of the openable-closable cover 78 is removably attached to an upper part of the support leg 76d by using a bolt or the like. The attachment bracket 340, the inching valve 338, the valve bracket 339, and the second cable stay 342 are disposed below the back part of the openable-closable cover 78.

As illustrated in FIGS. 4 and 5, the work machine 1 includes the adjuster 511, which adjusts the stroke of the operation of the brake pedal (pedal) 111.

Figure 13:
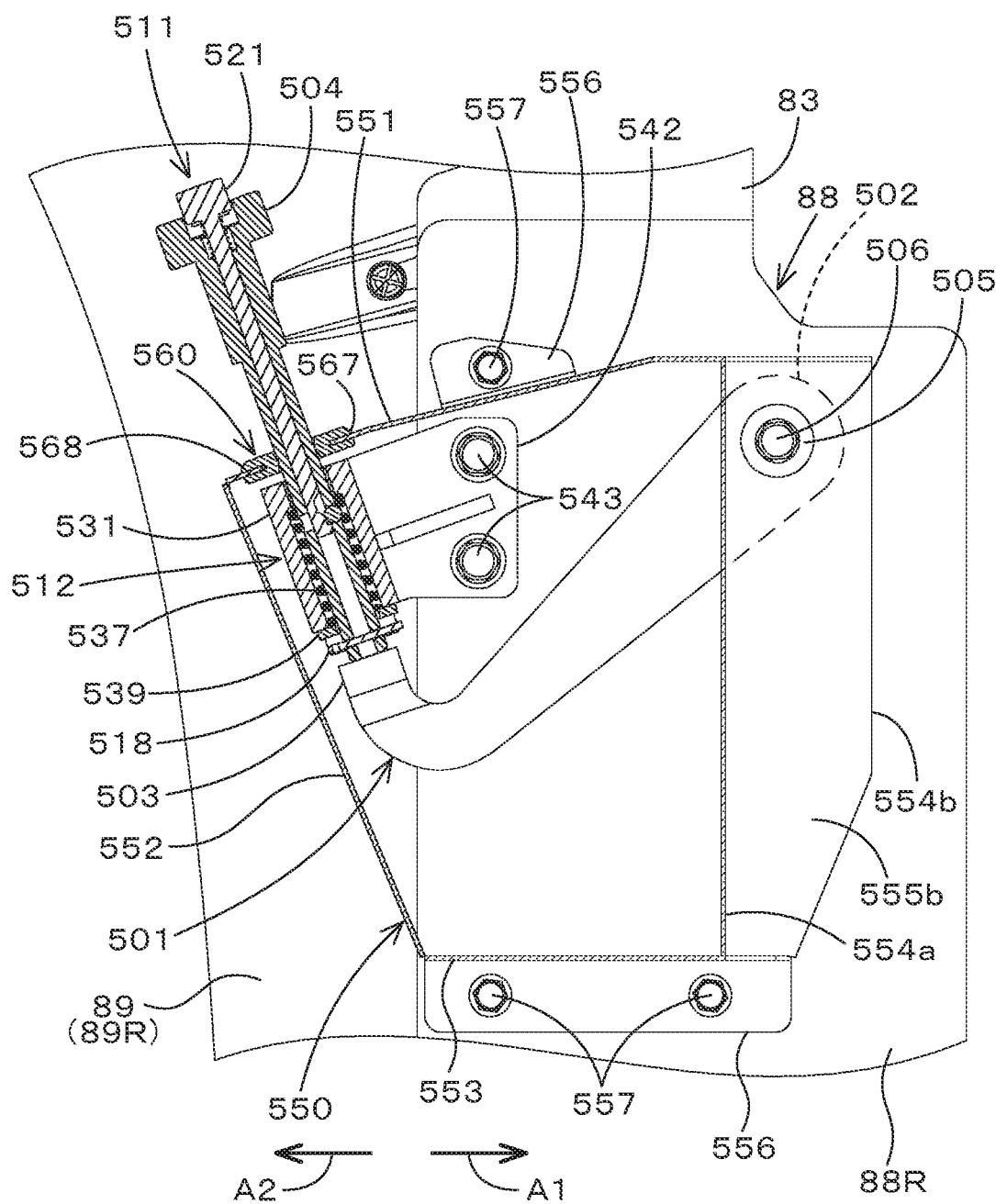
FIG. 13 is a longitudinal sectional view of the adjuster and a cover.

As illustrated in FIG. 13, the adjuster 511 has the swing member 501 described above, the movement member 504, and a switching mechanism 512. The movement member 504 is capable of performing movement in contact with the swing member 501. To be specific, the movement member 504 is capable of performing movement in contact with the contact portion 503 of the swing member 501. The movement member 504 changes the first position P1 of the swing member 501 (see FIG. 8) by performing the movement in contact with the swing member 501.

Figure 14:
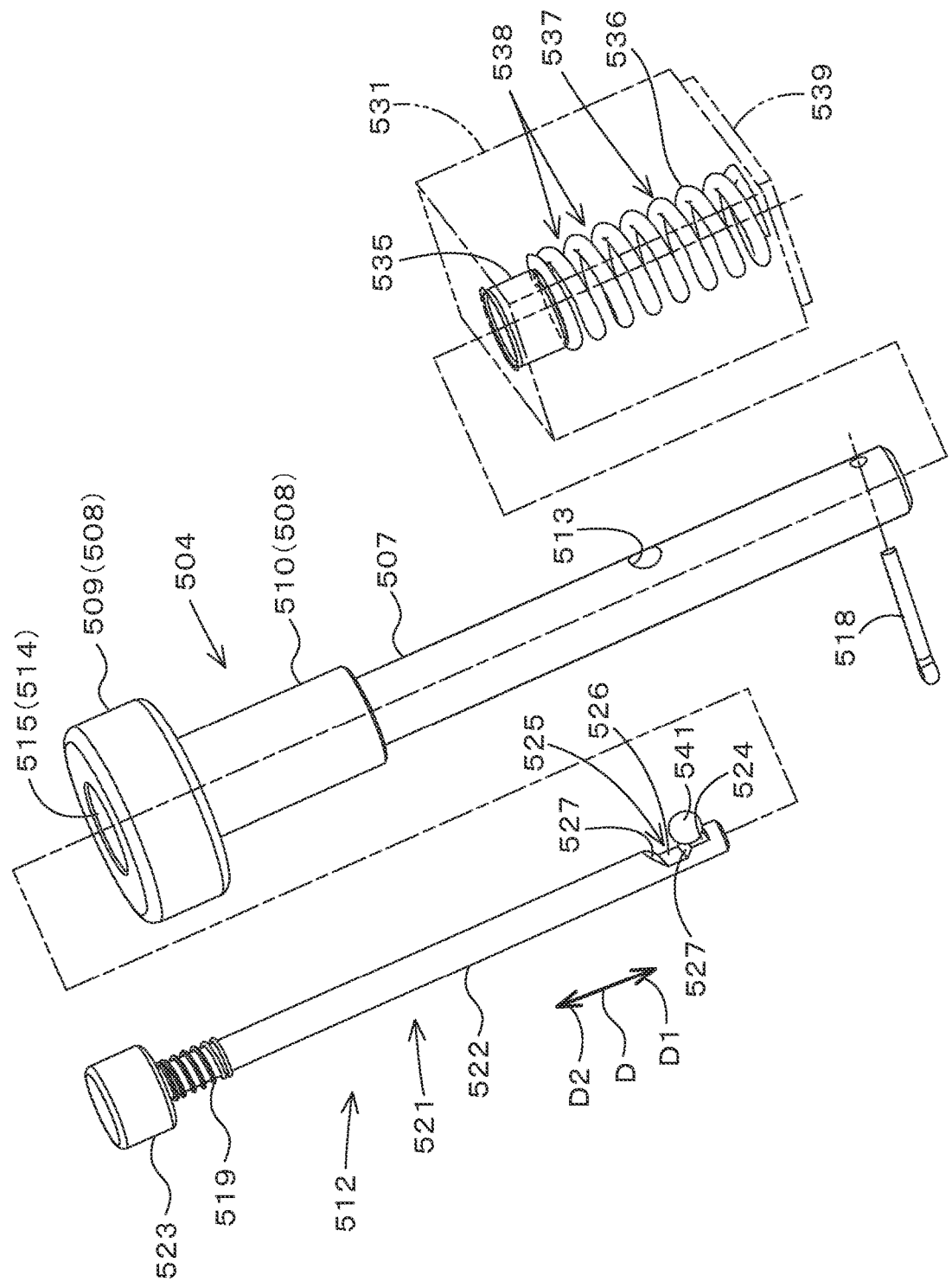
FIG. 14 is a partial exploded perspective view of the adjuster.
Figure 15A:
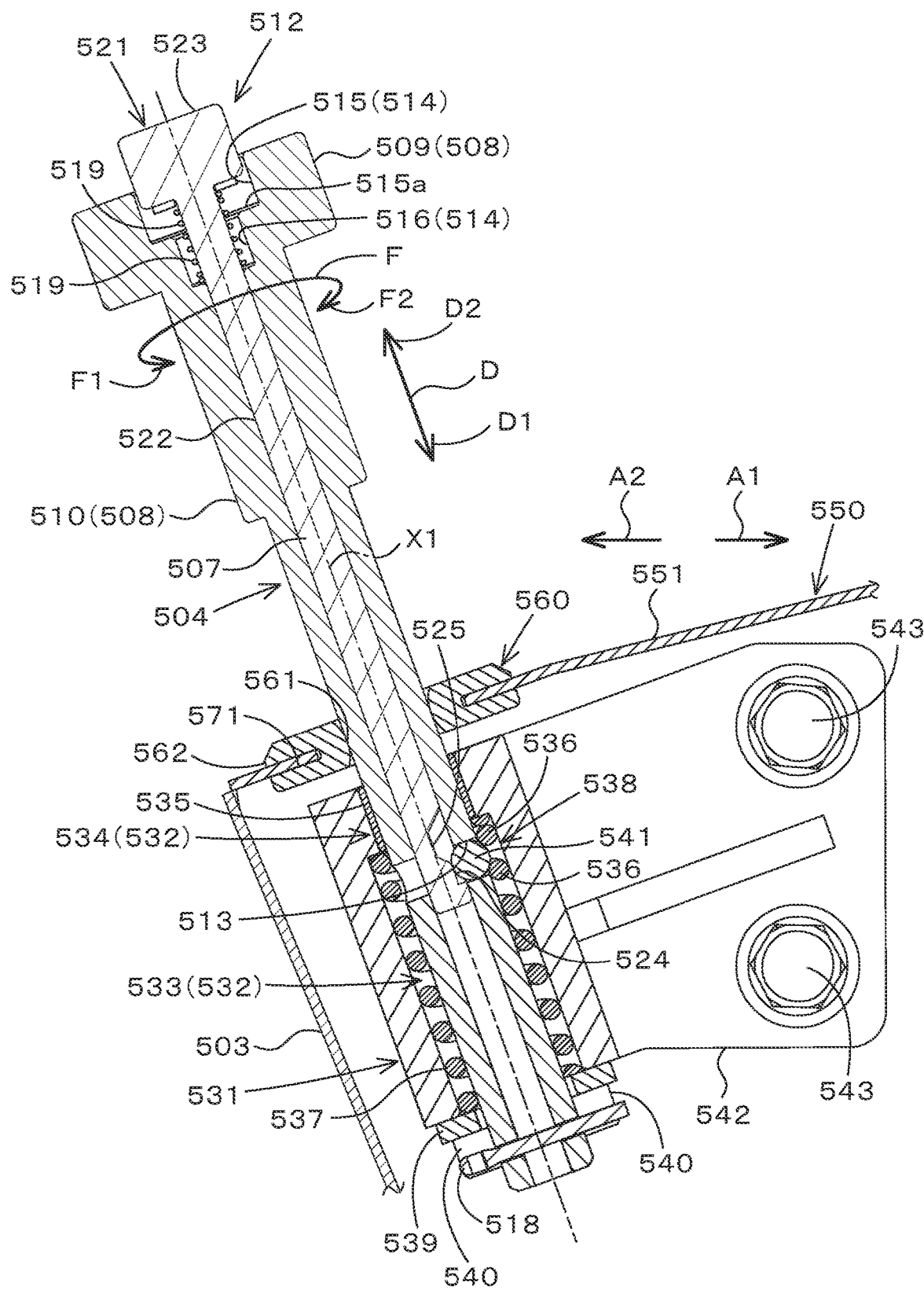
FIG. 15A is a partial longitudinal sectional view of the adjuster, illustrating a state in which an engagement member is engaged with a first engagement portion and a second engagement portion.

As illustrated in FIGS. 14 and 15A, the movement member 504 includes a tubular outer shaft (hereafter, referred to as "outer shaft 504"). As indicated by an arrow D in FIG. 15A, the outer shaft 504 is capable of performing movement in the axial direction (direction in which a central axis X1 of the outer shaft 504 extends). As indicated by an arrow F in FIG. 15A, the outer shaft 504 is rotatable around the central axis X1.

In the following description, the direction indicated by the arrow D will be referred to as "axial direction D". The direction in which an arrowhead D1 of the arrow D points will be referred to as "front-end direction", and the direction in which an arrowhead D2 pointes will be referred to as "back-end direction". The direction in which an arrowhead F1 of the arrow F points will be referred to as "regular rotation direction", and the direction in which the arrowhead F2 pointes will be referred to as "reverse rotation direction". The direction away from the central axis X1 in the radial direction of the outer shaft 504 (direction from the central axis X1 toward the outer peripheral surface) will be referred to as "radially outward direction".

The outer shaft 504 is capable of performing movement in both of the front-end direction D1 and the back-end direction D2. The outer shaft 504 is rotatable in both of the regular rotation direction F1 and the reverse rotation direction F2. As illustrated in FIGS. 14 and 15A, a through-hole 513 is formed in the outer shaft 504. The through-hole 513 is formed from the outer peripheral surface to the inner peripheral surface of the outer shaft 504. The through-hole 513 corresponds to a first engagement portion (hereafter, referred to as "first engagement portion 513") described below.

The outer shaft 504 has a small-diameter portion 507 and a large-diameter portion 508.

The small-diameter portion 507 is provided in the front-end direction D1 from the outer shaft 504. The small-diameter portion 507 is inserted through a block 531. A pin 518 is inserted through an end part of the small-diameter portion 507 in the front-end direction D1. The pin 518 prevents the small-diameter portion 507 from being removed from the block 531 when the outer shaft 504 moves in the back-end direction D2. As illustrated in FIG. 13, the block 531 is disposed inside of a cover 550 described below. A fixed plate 542 is fixed to the block 531. The fixed plate 542 is attached to the second side wall 88R of the column frame 88 by using a fastener (bolt) 543.

The large-diameter portion 508 includes a first large-diameter portion 509 and a second large-diameter portion 510. The first large-diameter portion 509 has a diameter larger than that of the second large-diameter portion 510. The first large-diameter portion 509 is provided in the back-end direction D2 from the outer shaft 504. The first large-diameter portion 509 is a portion that an operator grips with his/her hand when operating the outer shaft 504. The second large-diameter portion 510 is provided between the first large-diameter portion 509 and the small-diameter portion 507. The large-diameter portion 508 (the first large-diameter portion 509, the second large-diameter portion 510) is disposed outside of the block 531 and the cover 550.

As illustrated in FIGS. 14 and 15A, a recessed portion 514, which is cylindrically recessed in the front-end direction D1, is formed in an end part of the large-diameter portion 508 in the back-end direction D2. The recessed portion 514 is connected to the through-hole 513. The recessed portion 514 includes a first recessed portion 515 and a second recessed portion 516. The first recessed portion 515 has an inside diameter larger than that of the second recessed portion 516, and is disposed further in the back-end direction D2 than the second recessed portion 516.

The switching mechanism 512 is a mechanism that is switchable between a first state in which the switching mechanism 512 allows movement of the outer shaft (movement member) 504 and a second state in which the switching mechanism 512 prohibits movement of the outer shaft (movement member) 504.

As illustrated in FIGS. 14 and 15A, the switching mechanism 512 has an inner shaft 521 that is inserted into the outer shaft 504. The inner shaft 521 is capable of performing movement in the axial direction D of the outer shaft 504. When the outer shaft 504 rotates around the central axis X1, the inner shaft 521 rotates together with the outer shaft 504. That is, the inner shaft 521 and the outer shaft 504 rotate together.

As illustrated in FIGS. 14 and 15A, the inner shaft 521 has a shaft portion 522 and a head portion 523. The shaft portion 522 is inserted into the outer shaft 504. The head portion 523 is provided at an end part of the outer shaft 504 in the back-end direction D2. The outside diameter of the head portion 523 is larger than the outside diameter of the shaft portion 522. The head portion 523 is disposed in the first recessed portion 515 of the recessed portion 514 of the outer shaft 504. The outside diameter of the head portion 523 is smaller than the outside diameter of the first recessed portion 515 and is larger than the outside diameter of the second recessed portion 516. A spring 519 is disposed in the recessed portion 514.

The spring 519 presses the head portion 523 of the inner shaft 521 in the back-end direction D2 by generating an urging force (elastic repulsive force) in the extension direction. Thus, the inner shaft 521 is urged in the back-end direction D2. Therefore, when an operator is not operating the adjuster 511, the inner shaft 521 is in a state in which the inner shaft 521 is positioned in the back-end direction D2 with respect to the outer shaft 504 (hereafter, referred to as "retreated state") (see FIG. 15A).

Figure 17:
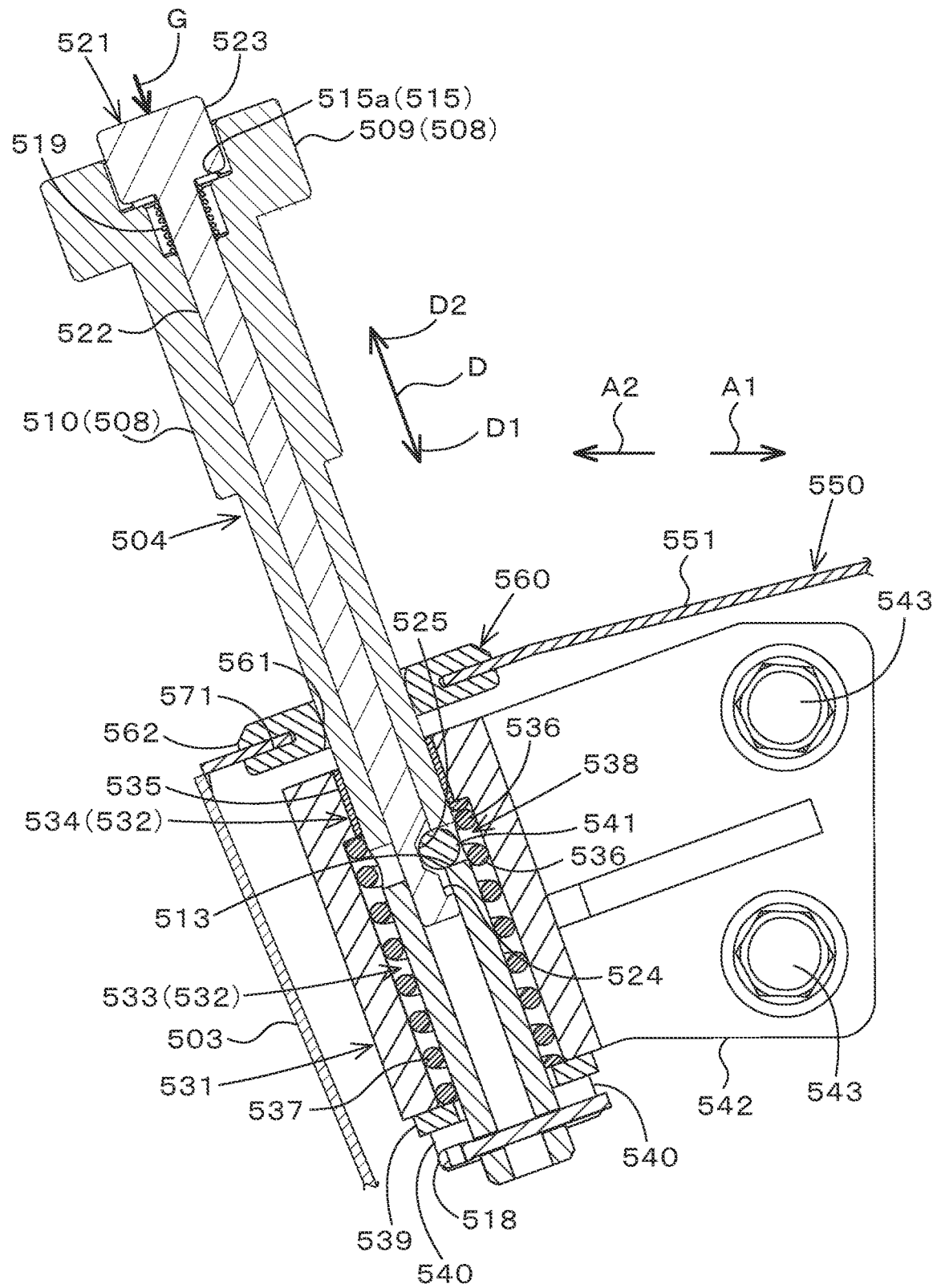
FIG. 17 is a partial longitudinal sectional view of the adjuster, illustrating a state in which the engagement member is engaged with the first engagement portion and released from the second engagement portion.

When the operator presses the head portion 523 of the inner shaft 521 in the front-end direction, the spring 519 contracts, and the inner shaft 521 moves in the front-end direction. Thus, as illustrated in FIG. 17, the inner shaft 521 enters a state in which the inner shaft 521 is positioned in the front-end direction D1 with respect to the outer shaft 504 (hereafter, referred to as "advanced state"). In the advanced state, the head portion 523 of the inner shaft 521 is in contact with or in proximity to an end surface 515a of the first recessed portion 515 in the front-end direction.

The switching mechanism 512 is switchable between the first state and the second state in accordance with the movement of the inner shaft 521. To be specific, in accordance movement of the inner shaft 521 from the retreated state to the advanced state, the switching mechanism 512 switches from the second state in which the switching mechanism 512 prohibits the movement of the outer shaft (movement member) 504 to the first state in which the switching mechanism 512 allows the movement of the outer shaft 504. In accordance with movement of the inner shaft 521 from the advanced state to the retreated state, the switching mechanism 512 switches from the first state in which the switching mechanism 512 allows the movement of the outer shaft 504 to the second state in which the switching mechanism 512 prohibits the movement of the outer shaft 504. This action of the switching mechanism 512 will be described below in detail.

Figure 15B:
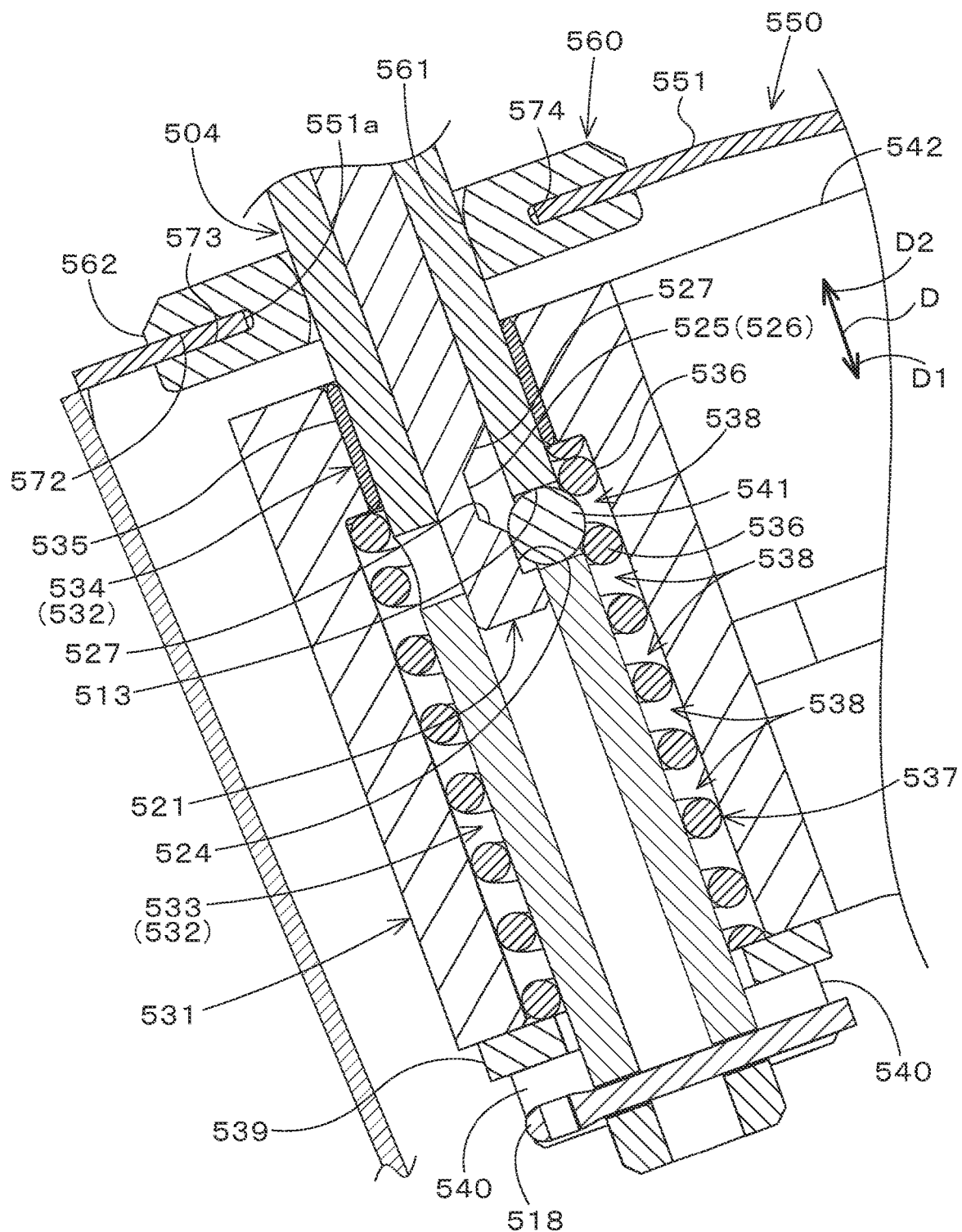
FIG. 15B is a partial enlarged view of FIG. 15A.

As illustrated in FIGS. 14, 15A, and 15B, the inner shaft 521 has a first recessed portion 524 and a second recessed portion 525 that are formed side by side in the axial direction D. The second recessed portion 525 is recessed deeper than the first recessed portion 524. The second recessed portion 525 is disposed further in the back-end direction D2 than the first recessed portion 524. The second recessed portion 525 has a deepest portion 526, which is recessed deepest, and an inclined portion 527, which is inclined so as to become gradually deeper toward the deepest portion 526. The inclined portion 527 is provided at each of a position in the front-end direction D1 from the deepest portion 526 and a position in the back-end direction D2 from the deepest portion 526. The inclined portion 527, which is provided at a position in the front-end direction D1, is continuous with the first recessed portion 524.

As illustrated in FIGS. 15A and 15B, the first recessed portion 524 and the second recessed portion 525 are disposed at positions where the first recessed portion 524 and the second recessed portion 525 overlap, in the axial direction D, a through-hole (first engagement portion) 513 that is formed in the outer shaft 504. When the inner shaft 521 is in the retreated state, the first recessed portion 524 overlaps the through-hole (first engagement portion) 513 in the axial direction D (see FIGS. 15A and 15B). When the inner shaft 521 is in the advanced state, the second recessed portion 525 overlaps the through-hole (first engagement portion) 513 in the axial direction D (see FIG. 17).

Figure 16:
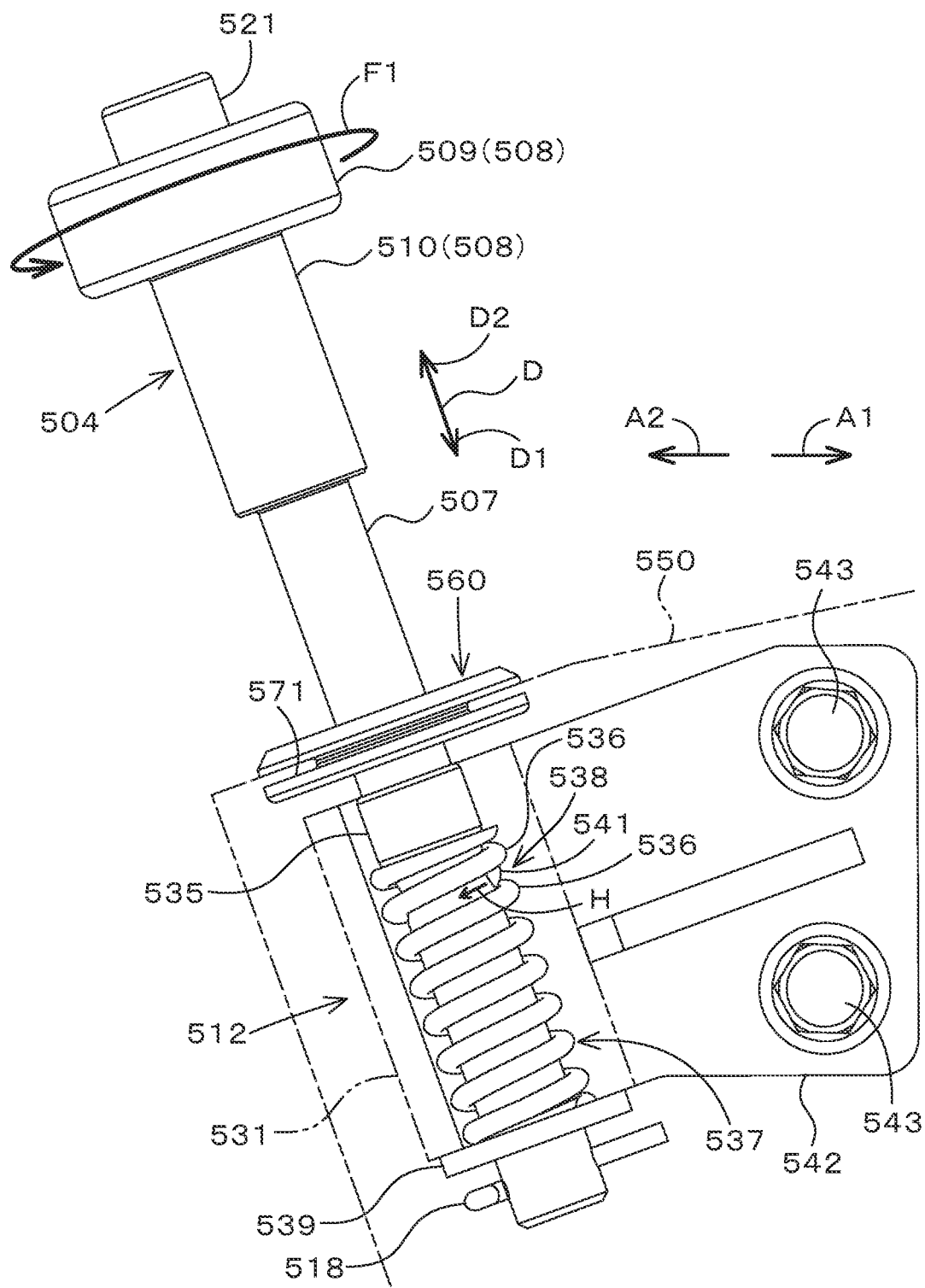
FIG. 16 is a partial side view of the adjuster.

As illustrated in FIGS. 14 to 16, the switching mechanism 512 has a wire 536 that is helically wound around the outer side of the outer shaft 504. The wire 536 forms a coil spring 537 by being wound at a constant pitch. The coil spring 537 is accommodated inside of the block 531. As illustrated in FIG. 15B, the block 531 has an accommodation hole 532. The accommodation hole 532 extends through the block 531 in the axial direction D. The accommodation hole 532 has a first accommodation portion 533 and a second accommodation portion 534. The first accommodation portion 533 is provided on the front-end direction D1 side. The second accommodation portion 534 is provided on the back-end direction D2 side. The first accommodation portion 533 has an inside diameter larger than that of the second accommodation portion 534 and has a length in the axial direction D larger than that of the second accommodation portion 534.

A stop plate 539 is fixed to an end part of the block 531 in the front-end direction by using a fastener (bolt) 540. The coil spring 537 is accommodated in the first accommodation portion 533. One end part of the coil spring 537 is fixed to an end part of the first accommodation portion 533 in the back-end direction D2. The other end part of the coil spring 537 is fixed to the stop plate 539. Thus, the coil spring 537 is fixed in the large-diameter portion 508, is incapable of moving and rotating, and is incapable of extending and contracting. A bush 535, which has a cylindrical shape, is accommodated in the second accommodation portion 534. The bush 535 is in contact with an inner peripheral surface of the second accommodation portion 534 and an outer peripheral surface of the outer shaft 504.

A gap 538 between turns of the wire 536, which appears at a predetermined interval in the axial direction D of the coil spring 537, corresponds to a second engagement portion (hereafter, referred to as "second engagement portion 538") described below. Because the coil spring 537 is incapable of moving, rotating, extending, and contracting, the interval (pitch) between turns of the wire 536 in the axial direction D is constant. Therefore, the second engagement portion 538, which includes the gap 538 between turns of the wire 536, is immovably disposed on the outer side of the outer shaft 504 at a predetermined interval in the axial direction D (see FIG. 15B).

As illustrated in FIGS. 15A and 15B, the through-hole (first engagement portion) 513, which is formed in the outer shaft 504, and the first recessed portion 524 and the second recessed portion 525, which are formed in the inner shaft 521, are disposed at positions where the through-hole (first engagement portion) 513, the first recessed portion 524, and the second recessed portion 525 overlap the coil spring 537 in the axial direction D. Thus, the through-hole (first engagement portion) 513, the first recessed portion 524, and the second recessed portion 525 can overlap the second engagement portion 538, which includes the gap 538 between turns of the wire 536 that forms the coil spring 537, in the axial direction D.

As illustrated in FIGS. 14, 15A, and 15B, the switching mechanism 512 has an engagement member 541 that is engageable in the first engagement portion (through-hole) 513 and into the second engagement portion (gap) 538. The engagement member 541 includes a ball (hereafter, referred to as "ball 541").

The inside diameter of the through-hole 513, which corresponds to the first engagement portion 513, is greater than or equal to the outside diameter of the ball 541, which corresponds to the engagement member 541. Therefore, as illustrated in FIG. 15B, the ball 541 can be fitted into the through-hole 513. When the ball 541 is fitted into the through-hole 513, the engagement member (ball) 541 is engaged in the first engagement portion (through-hole) 513.

The thickness of the small-diameter portion 507 of the outer shaft 504, in which the through-hole 513 is formed, is smaller than the diameter of the ball 541. Therefore, as illustrated in FIG. 15B, when the ball 541 is fitted into the through-hole 513 (when the engagement member (ball) 541 is engaged in the first engagement portion (through-hole) 513), a part of the ball 541 protrudes from the through-hole 513.

The gap 538 between turns of the wire 536, which corresponds the second engagement portion 538, is set to be smaller than the outside diameter of the ball 541, which corresponds to the engagement member 541. As illustrated in FIG. 15B and other figures, although the entirety of the ball 541 cannot be fitted into the gap 538, a part of the ball 541 near the surface thereof can be fitted into the gap 538. When a part of the ball 541 is fitted into the gap 538, the engagement member (ball) 541 is engaged into the second engagement portion (gap) 538.

The depth of each of the first recessed portion 524 and the second recessed portion 525, which are formed in the inner shaft 521, is smaller than the outside diameter of the ball 541. Thus, the ball 541 protrudes from the first recessed portion 524 in the radially outward direction (see FIGS. 15A and 15B) when fitted into the first recessed portion 524, and the ball 541 protrudes from the second recessed portion 525 in the radially outward direction (see FIG. 17) when fitted into the second recessed portion 525. A part of the ball 541 protruding from the first recessed portion 524 or the second recessed portion 525 can be fitted into the through-hole 513, which corresponds to the first engagement portion 513.

Because the second recessed portion 525 is recessed deeper than the first recessed portion 524, the protruding amount of the ball 541 when fitted into the first recessed portion 524 is larger than the protruding amount of the ball 541 when fitted into the second recessed portion 525.

Therefore, as illustrated in FIGS. 15A and 15B, when fitted into the first recessed portion 524, a part of the ball 541 protruding from the first recessed portion 524 is fitted into the first engagement portion (through-hole) 513 and is fitted also into the second engagement portion (gap) 538. This state is the second state in which the switching mechanism 512 prohibits the movement of the movement member 504. On the other hand, as illustrated in FIG. 17, when fitted into the second recessed portion 525, a part of the ball 541 protruding from the second recessed portion 525 is fitted into the first engagement portion (through-hole) 513 but is not fitted into the second engagement portion (gap) 538 (released from the second engagement portion (gap) 538). This state is the first state in which the switching mechanism 512 allows the movement of the movement member 504.

In other words, the ball 541 is engaged with the first engagement portion 513 and released from the second engagement portion 538 (see FIG. 17) when in the first state, and the ball 541 is engaged with the first engagement portion 513 and the second engagement portion 538 (see FIGS. 15A and 15B) when in the second state. Moreover, the ball 541 is fitted into the second recessed portion 525 when in the first state, and the ball 541 is fitted into the first recessed portion 524 when in the second state.

Hereafter, an adjustment method used by the adjuster 511 will be described, while describing the action of the switching mechanism 512.

FIG. 8 (see the reference numeral P1) and FIG. 13 illustrate a state in which the swing member 501 is at the first position. In this state, the brake pedal 111 is at the initial position of the stroke. This state is a state in which adjustment of the stroke of the brake pedal 111 by the adjuster 511 is not performed (unadjusted state). At this time, an end part of the outer shaft (movement member) 504 in the front-end direction is in contact with or in proximity to the contact portion 503 of the swing member 501. As illustrated in FIGS. 15A and 15B, the ball (engagement member) 541 is fitted into the first recessed portion 524 of the inner shaft 521, and is engaged in the through-hole (first engagement portion) 513 of the outer shaft 504 and into the second engagement portion (gap) 538. Therefore, the outer shaft 504 cannot move in the axial direction D. That is, the switching mechanism 512 is when in the second state in which the switching mechanism 512 prohibits the movement of the outer shaft (movement member) 504.

When the head portion 523 of the inner shaft 521 is pushed in the front-end direction D1 (see an arrow G in FIG. 17) from the state (unadjusted state) illustrated in FIGS. 15A and 15B, the inner shaft 521 moves in the front-end direction D1. Thus, the ball (engagement member) 541 becomes released from the first recessed portion 524 and fitted into the second recessed portion 525, and the ball (engagement member) 541 becomes released from the second engagement portion (gap) 538. As a result, it becomes possible for the outer shaft 504 to move in the axial direction D. That is, the switching mechanism 512 switches to the first state in which the switching mechanism 512 allows movement of the outer shaft (movement member) 504.

Figure 18:
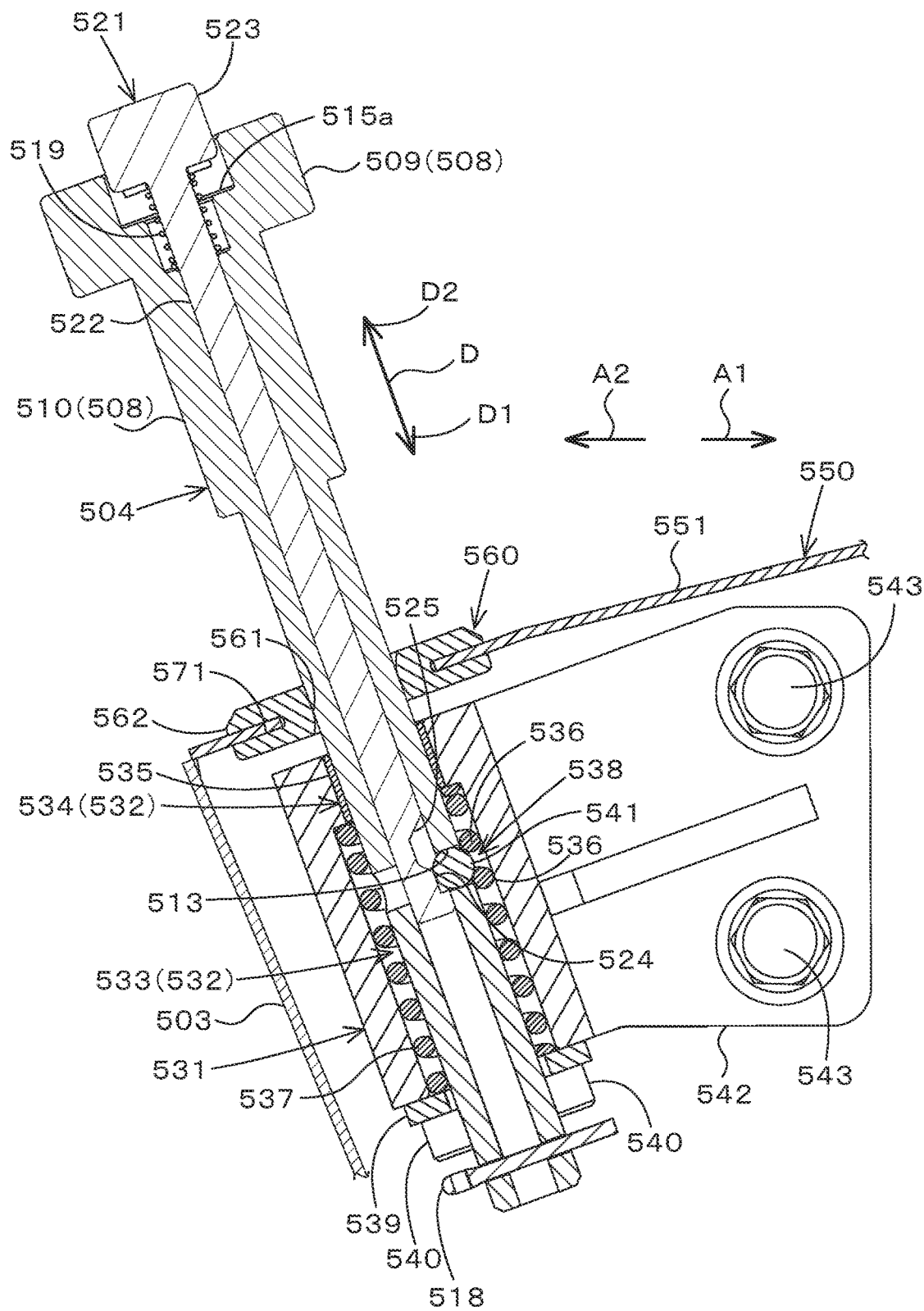
FIG. 18 is a longitudinal sectional view of the adjuster, illustrating a state in which the engagement member is engaged with the first engagement portion and another second engagement portion.

Next, when the outer shaft 504 is moved in the front-end direction D1, the ball 541 moves together with the outer shaft 504 in the front-end direction. Thus, as illustrated in FIG. 18, the ball 541 becomes released from the second recessed portion 525 and fitted into the first recessed portion 524, and becomes engaged with another second engagement portion 538 adjacent to the second engagement portion 538 with which the ball 541 has been engaged in the unadjusted state. That is, the ball 541 moves in the front-end direction D1 by one pitch of the coil spring 537, and the outer shaft 504 also moves in the front-end direction D1 by one pitch. At this time, because the ball 541 enters a state of being engaged with the first engagement portion 513 and the second engagement portion 538, the outer shaft 504 cannot move in the axial direction D. That is, the switching mechanism 512 reenters the second state in which the switching mechanism 512 prohibits the movement of the outer shaft (movement member) 504.

Figure 19:
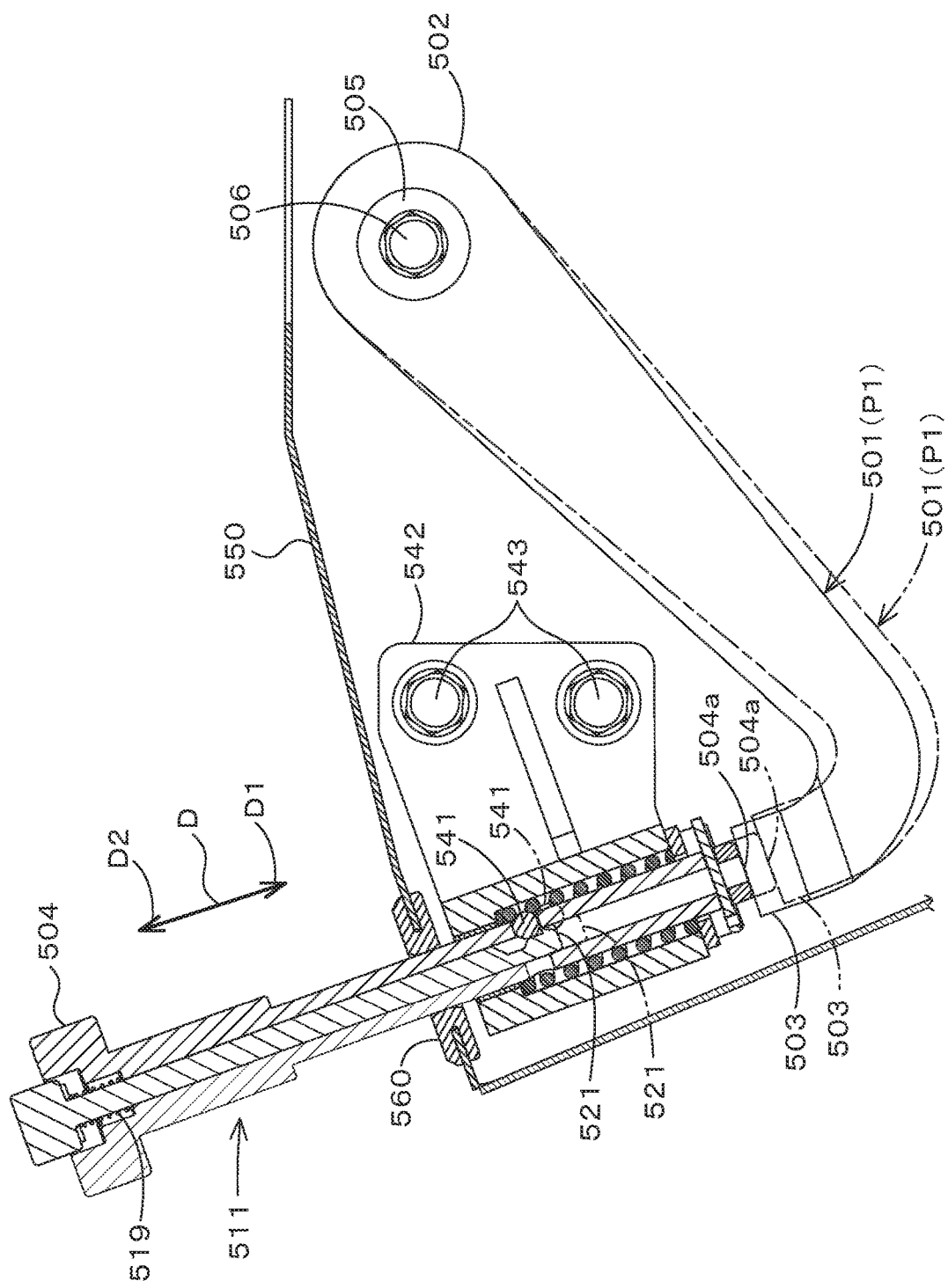
FIG. 19 illustrates a swing of a swing member in accordance with movement of an outer shaft.

In this way, when the outer shaft 504 moves in the front-end direction D1, a front end part 504a of the outer shaft 504 moves in contact with the contact portion 503 of the swing member 501 (see FIG. 19). Thus, pushed by the front end part 504a of the outer shaft 504, the swing member 501 swings from the position indicated by a solid line to the position indicated by an imaginary line. As a result, the first position P1 of the swing member 501 is changed from the position indicated by the solid line to the position indicated by the imaginary line. The direction of the change of the first position P1 is a direction toward the second position P2. In accordance with the change of the first position P1, the initial position of the stroke of the brake pedal 111 is changed. The changed initial position is fixed because the ball 541 is engaged with the second engagement portion 538.

In the above description, a case where the outer shaft 504 is moved in the front-end direction by one pitch of the coil spring 537 has been described. However, in a case where the outer shaft 504 is to be moved by two or more pitches of the coil spring 537 in the front-end direction, the above action may be repeated twice or more.

In a case where the outer shaft 504 is to be moved in the back-end direction D2, after fitting the ball 541 into the second recessed portion 525 by moving the inner shaft 521 in the front-end direction D1 from the state illustrated in FIG. 18, the outer shaft 504 is moved together with the ball 541 in the back-end direction D2. At this time, because the inner shaft 521 is pushed in the back-end direction D2 by the ball 541, which has been fitted into the second recessed portion 525, the inner shaft 521 moves together with the outer shaft 504 and enters a state illustrated in FIG. 17. Subsequently, the inner shaft 521 moves in the back-end direction D2 by receiving an urging force of the spring 519, and thus the ball 541 moves from the second recessed portion 525 to the first recessed portion 524. Thus, the ball 541 is pushed in the radially outward direction and becomes engaged with the second engagement portion 538, and enters a state illustrated in FIGS. 15A and 15B.

When the outer shaft 504 moves in the back-end direction D2, the swing member 501 swings so as to return from the position indicated by the imaginary line to the position indicated by the solid line in FIG. 19 due to the urging force of the return spring 131. As a result, the first position P1 of the swing member 501 is changed. The direction of the change of the first position P1 is a direction away from the second position P2. In accordance with the change of the first position P1, the initial position of the stroke of the brake pedal 111 is changed. The changed initial position is fixed when the ball 541 becomes engaged with the second engagement portion 538.

With the above method, by moving the outer shaft 504 in the front-end direction or in the back-end direction, it is possible to change the first position of the swing member 501 and to change the initial position of the stroke of the brake pedal 111.

However, with the above method, it is only possible to move the outer shaft 504 by a distance measured by one pitch of the coil spring 537. Therefore, it may be difficult to finely adjust the initial position of the stroke of the brake pedal 111 to a position that an operator wishes. Hereafter, a method of finely adjusting the initial position of the stroke of the brake pedal 111 will be described.

Figure 20:
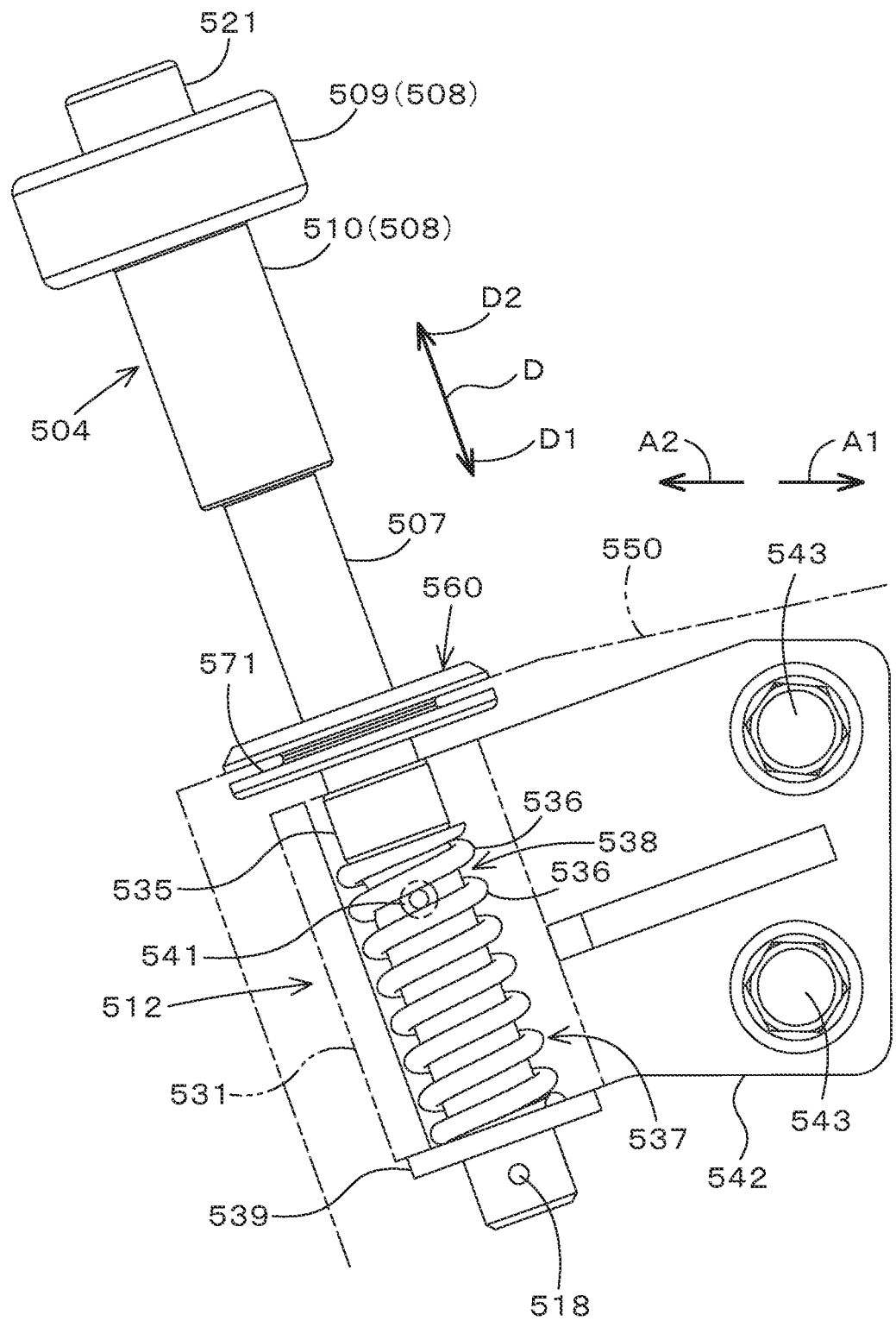
FIG. 20 is a partial side view of the adjuster, illustrating a state in which the outer shaft is rotated from the state illustrated in FIG. 16.

In a case where the initial position of the stroke of the brake pedal 111 is to be finely adjusted from the state illustrated in FIGS. 15A, 15B, and 16, as indicated by an arrow F1 in FIG. 16, the outer shaft 504 is rotated in the regular rotation direction F1 around the central axis X1. At this time, because the inner shaft 521 rotates together with the outer shaft 504, the ball 541 performs helical movement along the wire 536 (see an arrow H) in accordance with the rotation of the outer shaft 504, while the ball 541 is maintained in a state of being fitted into the first recessed portion 524 and in a state of being engaged with the second engagement portion 538. As a result, the outer shaft 504 moves together with the ball 541 in the front-end direction D1. FIG. 20 illustrates a state in which the outer shaft 504 is moved in the front-end direction D1 by moving the outer shaft 504 by a quarter of one pitch of the coil spring 537 from the state (unadjusted state) illustrated in FIGS. 15A, 15B, and 16. In a case where the outer shaft 504 is to be moved by a distance longer than a quarter of one pitch, the outer shaft 504 may be rotated further in the regular rotation direction F1.

In a case where the outer shaft 504 is to be moved in the back-end direction D2, the outer shaft 504 may be rotated around the central axis X1 in the reverse rotation direction F2 (see FIG. 15).

With the above method, it is possible to move the outer shaft 504 in the front-end direction D1 or in the back-end direction D2 by rotating the outer shaft 504 around the central axis X1, and thereby it is possible to change the first position of the swing member 501 and to change the initial position of the stroke of the brake pedal 111. With this method, it is possible to move the outer shaft 504 by a distance smaller than one pitch of the coil spring 537, and thus it is possible to finely adjust the initial position of the stroke of the brake pedal 111 to a desirable position.

As described above, with the adjuster 511, it is possible to change the first position P1 of the swing member 501 (see FIG. 8) by moving the outer shaft 504.

When the outer shaft 504 is not moved (is at a position farthest in the back-end direction D2) and the first position P1 of the swing member 501 is not changed (adjustment by the adjuster 511 is not performed), in a state in which the brake pedal 111 is not depressed (a state in which the brake pedal 111 is at the initial position of the stroke), the rotary spool of the valve body 338A of the inching valve 338 is at the first position 3381 and the inching valve 338 is in the off-state (closed state).

When the outer shaft 504 is moved by the adjuster 511 in the front-end direction D1 from the off-state (when the first position P1 of the swing member 501 is moved toward the second position P2), in a state in which the brake pedal 111 is not depressed, the rotary spool of the valve body 338A is positioned between the first position 3381 and the second position 3382. That is, in the state in which the brake pedal 111 is not depressed, the inching valve 338 is slightly open.

By adjusting the amount of movement of the outer shaft 504 (the amount of movement in the front-end direction D1 from a position of first contact with the contact portion 503), it is possible to steplessly (in any appropriate range) adjust the valve opening degree of the inching valve 338 in the state in which the brake pedal 111 is not depressed. Thus, it is possible to steplessly adjust the speed of the work machine 1 (the output power of the travel device 17) in the state in which the brake pedal 111 is not depressed. Moreover, it is possible to steplessly adjust the output power of the travel device 17 (the speed of the work machine 1) without operating an accelerator pedal 500.

As illustrated in FIGS. 4 and 5, the adjuster 511 is attached to the steering column 87, which supports the steering wheel 15. To be specific, the adjuster 511 is attached to a side surface of the steering column 87. The side surface of the steering column 87 to which the adjuster 511 is attached is a side surface (right side surface) on a side opposite to the brake pedal 111 side. To be specific, the adjuster 511 is attached to an outer surface of the second side wall 88R of the column frame 88 (surface facing in the machine-body-outward direction).

The adjuster 511 is disposed at a position where the adjuster 511 overlaps the steering wheel 15 in the front-back direction K1 and the machine-body-width direction K2. As illustrated in FIG. 5, the adjuster 511 is disposed further toward the left side (the machine-body-inward side) than a right end part of the steering column 87. As illustrated in FIG. 5, the adjuster 511 is disposed between the accelerator pedal 500 and the steering column 87 in the machine-body-width direction K2.

As illustrated in FIG. 4, the adjuster 511 is disposed at a position where the adjuster 511 overlaps the accelerator pedal 500 in the front-back direction K1. The adjuster 511 is disposed at a position further forward than a back end part of the steering column 87 in the front-back direction K1, and does not protrude backward from the back end part of the steering column 87.

As illustrated in FIG. 4, the adjuster 511 is disposed at a height where the adjuster 511 overlaps a seat portion 13a of the driver's seat 13 in the up-down direction. To be specific, an end part (upper end part) of the outer shaft 504 of the adjuster 511 in the back-end direction and an end part (upper end part) of the inner shaft 521 in the back-end direction are disposed at heights where the end part (upper end part) of the outer shaft 504 and the end part (upper end part) of the inner shaft 521 overlap the seat portion 13a of the driver's seat 13. The end part (upper end part) of the outer shaft 504 of the adjuster 511 in the back-end direction and the end part (upper end part) of the inner shaft 521 in the back-end direction are disposed at positions that are lower than an upper surface (seat surface) of the seat portion 13a.

As illustrated in FIGS. 4 to 6, 13, 21, and 22, the adjuster 511 has the cover 550. The cover 550 is attached to the second side wall 88R of the column frame 88 by using fasteners (bolts) 557. The cover 550 covers the outer peripheral side of the outer shaft 504. As illustrated in FIG. 13, a front end part of the outer shaft 504 is disposed inside of the cover 550, and a back end part of the outer shaft 504 is disposed outside of the cover 550. The outer shaft 504 is inclined with respect to a vertical direction so as to shift from the back side (one side) to the front side (the other side) toward a lower part thereof.

Figure 21:
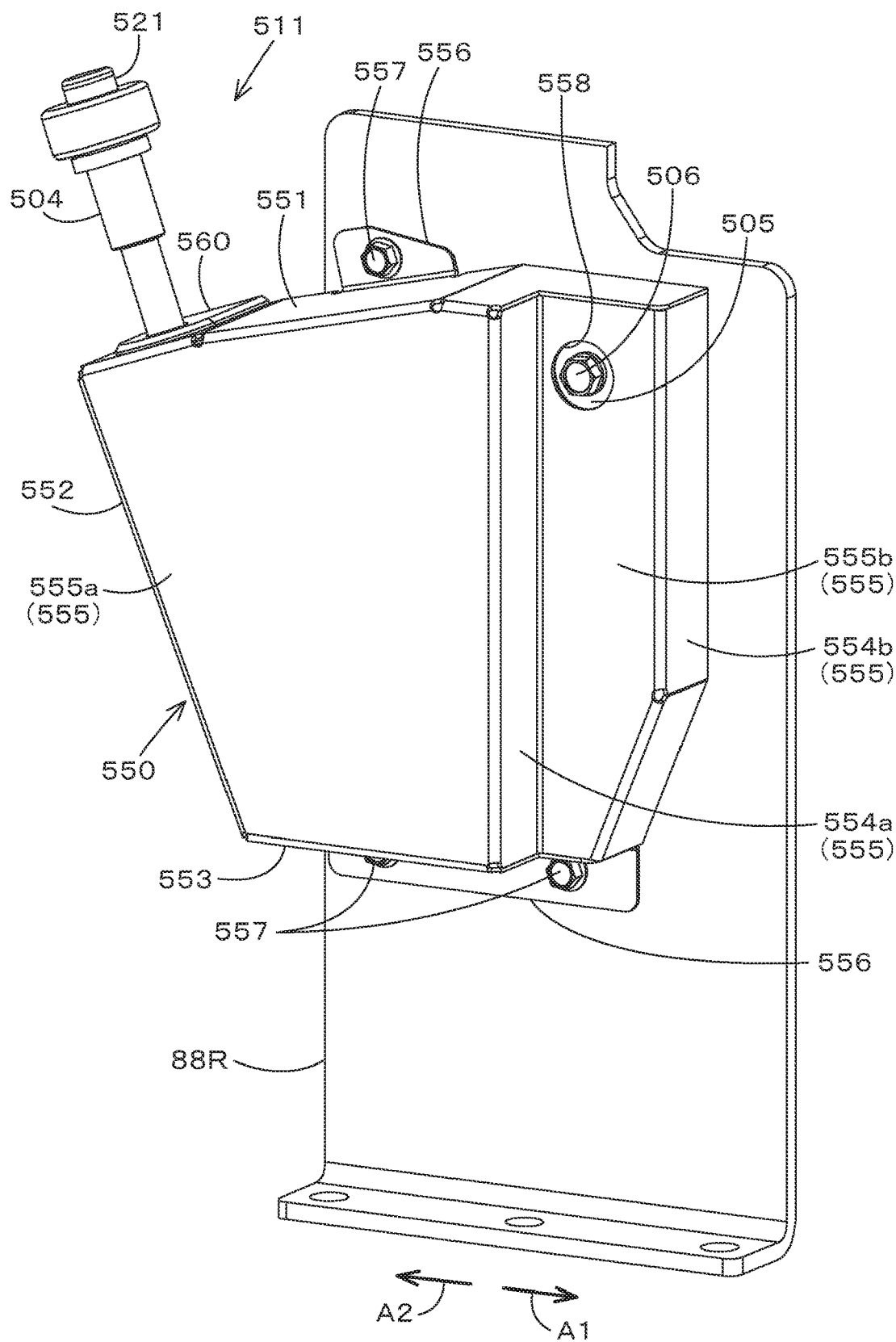
FIG. 21 is a right front perspective view of the cover and the adjuster.
Figure 22:
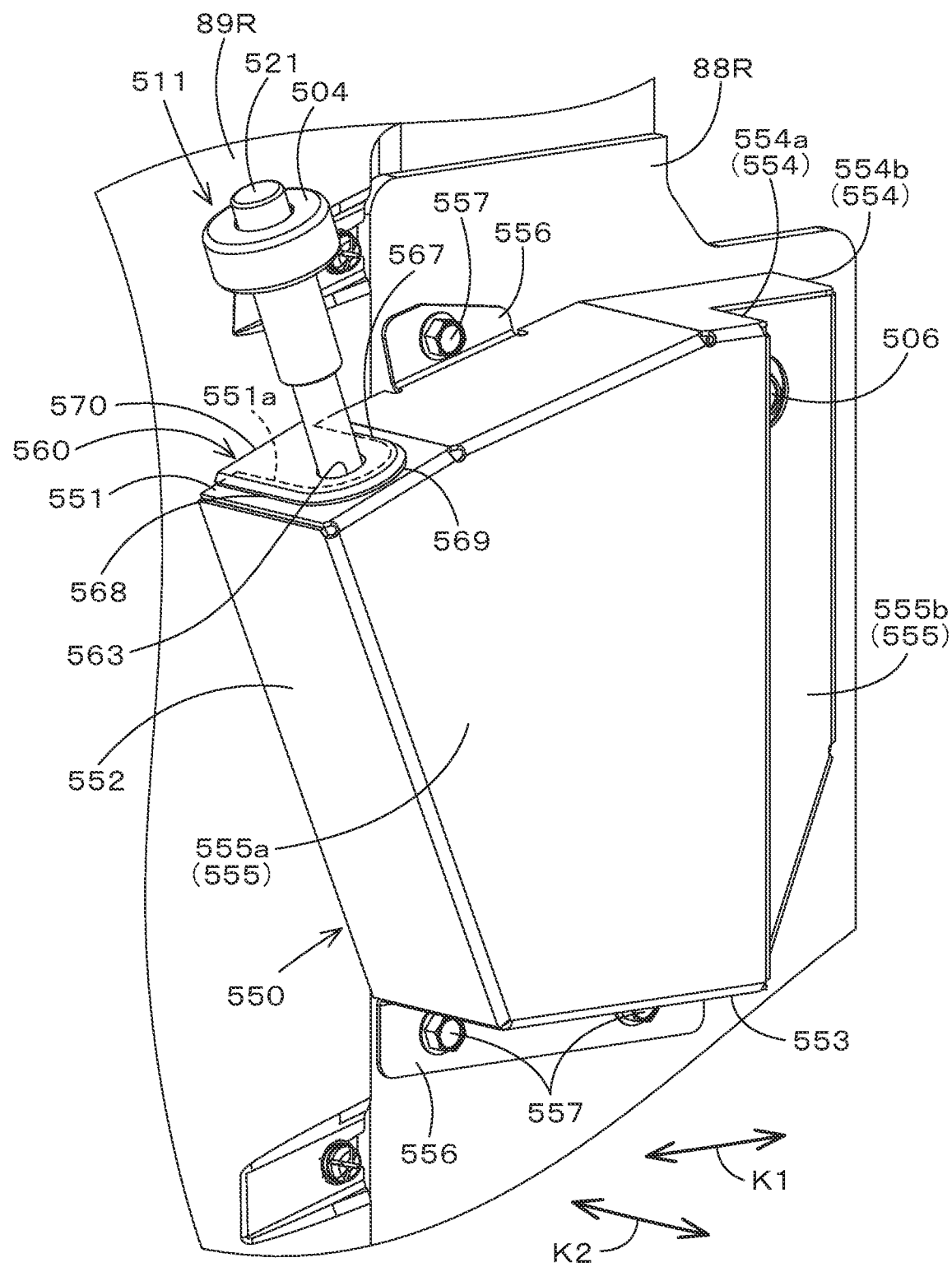
FIG. 22 is a right back perspective view of the cover and the adjuster.
Figure 23:
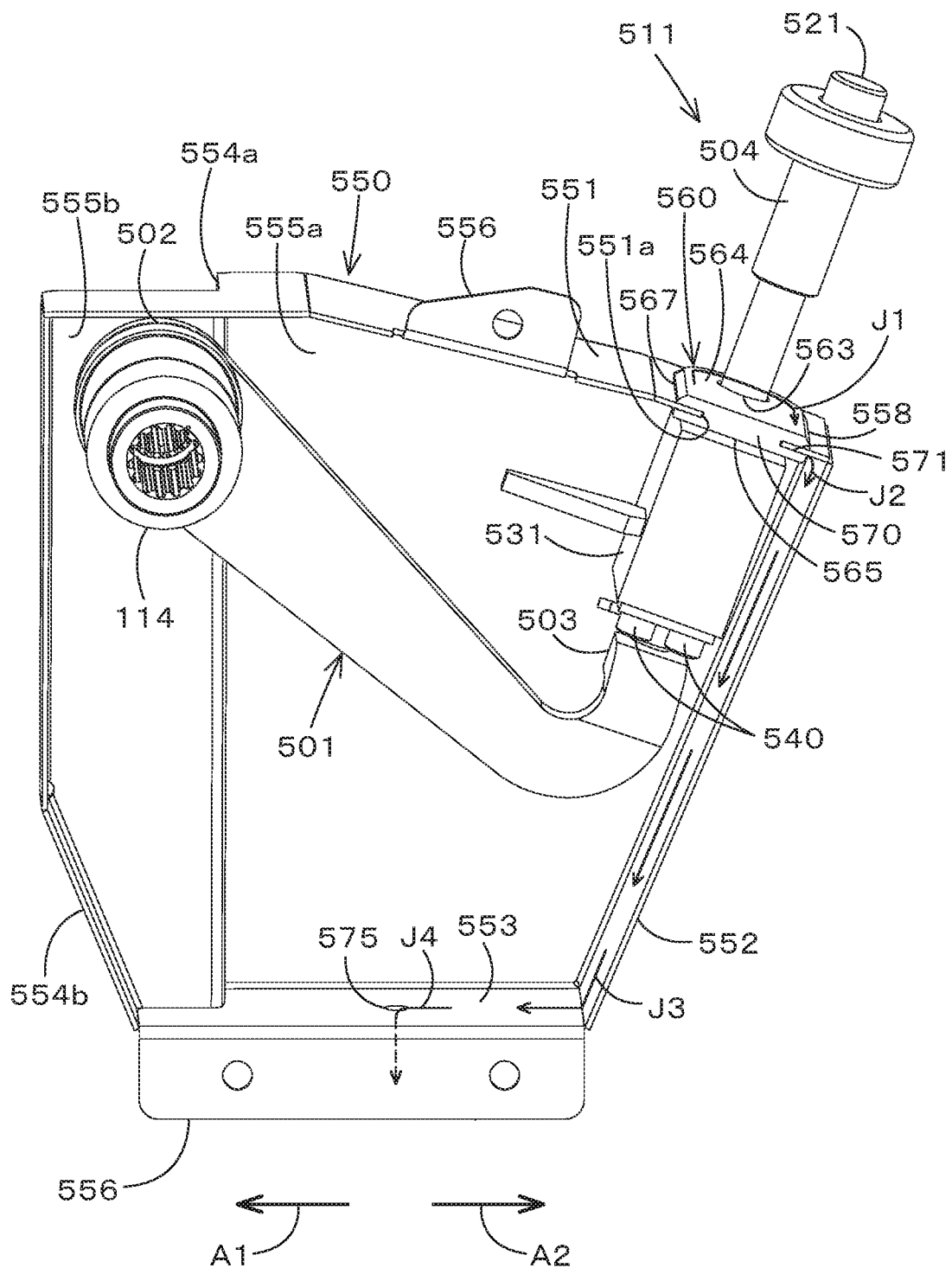
FIG. 23 is a left front perspective view of the cover and the adjuster.

As illustrated in FIGS. 13, 21, 22, and other figures, the cover 550 includes an upper plate (first plate) 551, a back plate (second plate) 552, a lower plate (third plate) 553, a front plate 554, and a right side plate 555. As illustrated in FIG. 23, the left side of the cover 550 is open. As illustrated in FIG. 22, the left side of the cover 550, which is open, is covered by the second side wall 88R and a right side wall 89R of the column cover 89. Thus, the periphery of the outer shaft 504 in the front-end direction is covered by the cover 550, the second side wall 88R, and the right side wall 89R.

The outer shaft 504 is capable of performing movement relative to the cover 550 in the axial direction D of the outer shaft 504 (see FIG. 20).

The upper plate 551 is inclined so as to descend from the front side (the other side) toward the back side (one side). As illustrated in FIGS. 15B, 22, and 23, an opening 551a, through which the outer shaft 504 is inserted, is formed in the upper plate 551. As illustrated in FIG. 22, the opening 551a is formed by cutting the upper plate 551 in a U-shape from the left side (the right side wall 89R side) toward the right side.

The back plate 552 is connected to the upper plate 551 on the back side (one side) of the outer shaft 504. The back plate 552 is inclined so as to shift from the back side (one side) to the front side (the other side) toward a lower part thereof. The lower plate 553 is connected to a lower end part of the back plate 552. The lower plate 553 extends toward the front side (the other side) from the lower end part of the back plate 552 and faces the upper plate 551. The lower plate 553 is horizontally disposed in the present embodiment. However, the lower plate 553 may be inclined so as to descend from the front side (the other side) toward the back side (one side).

The front plate 554 includes a first front plate 554a and a second front plate 554b. The right side plate 555 includes a first right side plate 555a and a second right side plate 555b. The first front plate 554a is disposed backward of the second front plate 554b. The first right side plate 555a is disposed backward of the second right side plate 555b. The first right side plate 555a connects the back plate 552, the upper plate 551, and the lower plate 553. The first front plate 554a connects the first right side plate 555a, the upper plate 551, and the lower plate 553. The second right side plate 555b connects the second front plate 554b, the upper plate 551, and the lower plate 553. The second front plate 554b connects the second right side plate 555b, the upper plate 551, and the lower plate 553.

An attachment piece 556, which is in contact with and attached to the second side wall 88R, extends from each of the upper plate 551 and the lower plate 553. The fasteners (bolts) 557 are inserted through the attachment pieces 556, and the fasteners 557 are attached to the second side wall 88R. A circular opening 558 (see FIG. 21) is formed in the second right side plate 555b, and the press plate 505 and the fastener (bolt) 506, which are provided on a right end part of the brake shaft 112, are exposed from the opening 558.

As illustrated in FIGS. 13, 15A, 15B, and 21 to 23, a sealing member 560 is attached to the cover 550. The sealing member 560 is made of an elastic material such as a rubber. The sealing member 560 seals the gap between an outer peripheral surface of the outer shaft 504 and an opening edge of the opening 551a. As illustrated in FIG. 15B and other figures, the sealing member 560 has an inner edge portion 561, which is in close contact with the outer peripheral surface of the outer shaft 504 by elastic deformation, and an outer edge portion 562, which is attached to the opening edge of the opening 551a.

Figure 24:
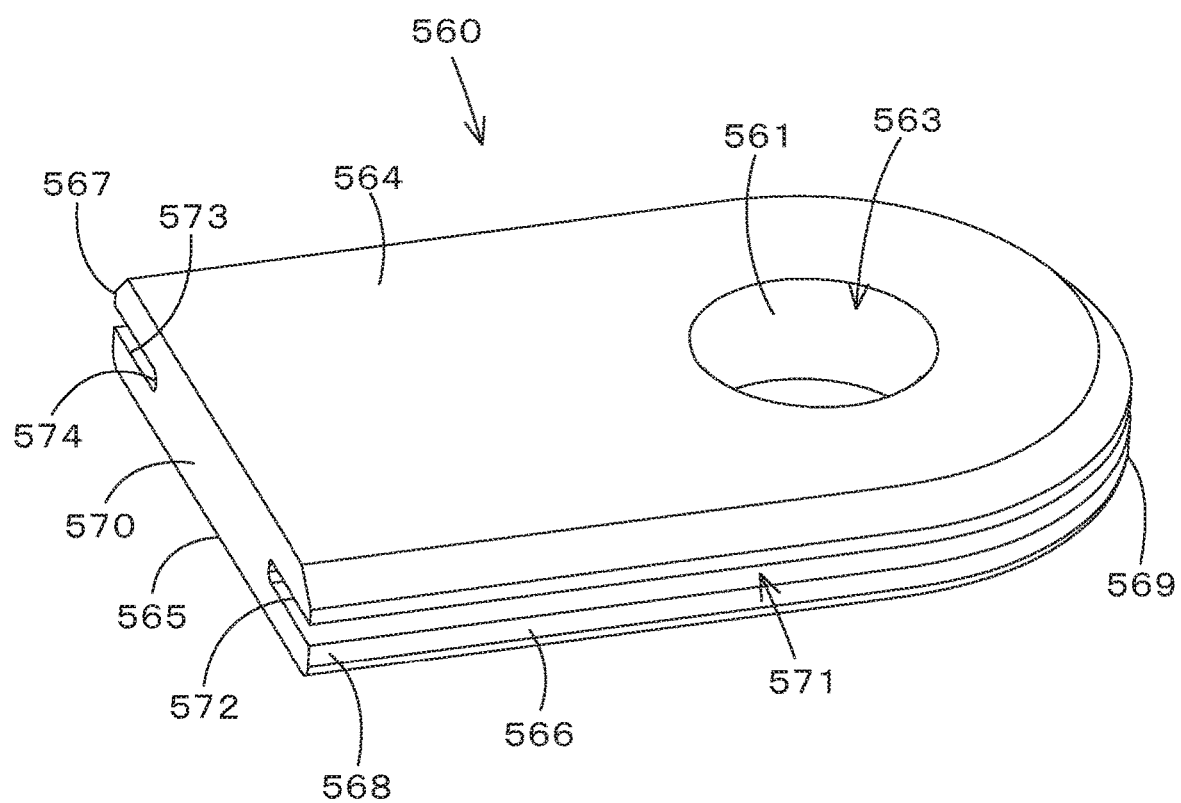
FIG. 24 is a perspective view of a sealing member.

As illustrated in FIG. 24, the sealing member 560 is formed in a thin plate-like shape and has a circular hole 563. The sealing member 560 has an upper surface 564, a lower surface 565, and a side surface 566. The upper surface 564 and the lower surface 565 are flat surfaces that are parallel to each other. The circular hole 563 extends through the sealing member 560 from the upper surface 564 to the lower surface 565.

As illustrated in FIG. 24, the side surface 566 has a first region 567, a second region 568, a third region 569, and a fourth region 570. The first region 567 and the second region 568 extend linearly and parallel to each other. The third region 569 extends so as to connect one end part of the first region 567 and one end part of the second region 568. The third region 569 has an arc-shape that extends concentrically with the circular hole 563. The fourth region 570 extends so as to connect the other end part of the first region 567 and the other end part of the second region 568. The distance between the fourth region 570 and the center of the circular hole 563 is longer than the distance between any of the other regions (the first region 567, the second region 568, and the third region 569) and the center of the circular hole 563.

An inner peripheral edge of the circular hole 563 forms the inner edge portion 561 of the sealing member 560. As illustrated in FIG. 15B, the inner edge portion 561 of the sealing member 560 has a curved-surface shape that bulges toward the outer peripheral surface of the outer shaft 504. The inner edge portion 561, which has a curved-surface shape, is in close contact with the outer peripheral surface of the outer shaft 504 in a state in which a bulging end (the vertex of bulge) is compressed by elastic deformation. Thus, water is prevented from entering from the gap between the inner edge portion 561 of the sealing member 560 and the outer peripheral surface of the outer shaft 504.

The inner edge portion 561 of the sealing member 560 is in contact with the outer peripheral surface of the outer shaft 504 over the entire area in the circumferential direction. Therefore, it is possible to prevent water from entering from the gap between the inner edge portion 561 of the sealing member 560 and the outer peripheral surface of the outer shaft 504 over the entire area of the outer peripheral surface of the outer shaft 504 in the circumferential direction.

The side surface 566 forms an outer edge portion of the sealing member 560. As illustrated in FIG. 24, a recessed groove 571 is formed in the side surface 566. The recessed groove 571 has an upper wall 572, a lower wall 573, and an inner wall 574. The recessed groove 571 is formed in the first region 567, the second region 568, and the third region 569. The recessed groove 571 is not formed in the fourth region 570. Thus, the fourth region 570 has a flat-surface shape.

As illustrated in FIG. 15B, the opening edge (inner edge portion) of the opening 551a, through which the outer shaft 504 is inserted, is fitted into the outer edge portion 562 of the sealing member 560. In a state in which the opening edge of the opening 551a is fitted into the outer edge portion 562 of the sealing member 560, the upper wall 572 of the recessed groove 571 is in contact with an upper surface of the upper plate 551 of the cover 550, and the lower wall 573 of the recessed groove 571 is in contact with a lower surface of the upper plate 551 of the cover 550. The recessed groove 571 holds the upper plate 551 and the lower plate 553 therein by using an elastic force. Thus, the sealing member 560 is attached to the upper plate 551 of the cover 550.

As described above, the opening 551a is formed by cutting the upper plate 551 in a U-shape from the left side toward the right side the opening 551a (see FIG. 22). Therefore, it is possible to easily attach the sealing member 560 to the upper plate 551 by fitting the sealing member 560 in the recessed groove 571 along the opening edge of the opening 551a from the left side of the upper plate 551.

As illustrated in FIG. 22, in a state in which the sealing member 560 is attached to the upper plate 551 of the cover 550, the first region 567 and the second region 568 extend in the machine-body-width direction K2. One end part of the third region 569, which is connected to the first region 567, is disposed on the front side, and the other end part of the third region 569, which is connected to the second region 568, is disposed on the back side. The fourth region 570 extends in the front-back direction K1 and is in contact with the right side wall 89R of the column cover 89. As illustrated in FIG. 13, the first region 567 is positioned further forward than a front end of an upper end surface of the block 531. The second region 568 is positioned further backward than a back end of the upper end surface of the block 531.

As illustrated in FIG. 23, a water drain hole 575, for draining water that has entered the inside of the cover 550, is formed in the lower plate 553. There may be a case where water that has adhered to the upper plate 551 of the cover 550 may enter the recessed groove 571 of the sealing member 560. In this case, water that has entered the recessed groove 571 flows along the recessed groove 571 from the front side toward the back side (see an arrow J1), because the upper plate 551 is inclined. To be specific, water that has entered from the recessed groove 571 formed in the first region 567 flows to the recessed groove 571 formed in the second region 568 through the recessed groove 571 formed in the third region 569, then flows along the lower surface of the upper plate 551, reaches the back plate 552 as indicated by an arrow J2 (see the arrow J2), flows downward along the back plate 552 and reaches the upper surface of the lower plate 553 (see an arrow J3), and is drained from the water drain hole 575 to the outside of the cover 550 (see an arrow J4).

In this way, the recessed groove 571, which functions as a water guide groove for guiding water, causes water to circumvent the outer shaft 504 and to detour from the front side (the other side) to the back side (one side) of the outer shaft 504. The water that has detoured flows downward inside of the cover 550 through the front side (the other side) of the outer shaft 504, and then is drained from the water drain hole 575 to the outside of the cover 550. Thus, even if water enters the inside of the cover 550, it is possible to prevent entry of the water from the gap between the outer shaft 504 and the block 531, and it is also possible to prevent accumulation of the water inside of the cover 550.

Although not illustrated, as a measure against entry of water, a configuration such that upper parts (back end parts) of the outer shaft 504 and the inner shaft 521 are covered by a shaft cover made of an elastic material such as a rubber may be used. In this case, the shaft cover may be configured, for example, to cover at least the first large-diameter portion 509 of the outer shaft 504 and the head portion 523 of the inner shaft 521.

As heretofore described, the work machine 1 according to the present embodiment includes: the machine body 2; the travel device 17 that supports the machine body so that the machine body 2 is capable of traveling; the hydraulic drive 353 that hydraulically drives the travel device 17; the pedal (brake pedal) 111 for performing a braking operation of the travel device 17; the inching valve 338 that changes, in response to an operation of the pedal 111, the flow rate of a hydraulic fluid supplied to the hydraulic drive 353; and the adjuster 511 that adjusts the stroke of the operation of the pedal 111. The adjuster 511 includes the swing member 501 that swings in coordination with an operation of the pedal 111 and that is at the first position P1 when the pedal 111 is at the initial position of the stroke, the movement member 504 that is capable performing movement in contact with the swing member 501 and that changes the first position P1 by performing the movement in contact with the swing member 501, and the switching mechanism 512 that is switchable between the first state in which the switching mechanism 512 allows the movement of the movement member 504 and the second state in which the switching mechanism 512 prohibits the movement of the movement member 504.

With this configuration, in the work machine 1 including the inching valve 338 that is activated in response to the operation of the pedal 111, it is possible to adjust the initial position of the operation of the pedal 111 by moving the movement member 504, and it is possible to fix the adjusted initial position by prohibiting movement of the movement member 504 by using the switching mechanism 512. Therefore, it is possible to easily adjust and fix the stroke (inching region) of a pedal operation for activating the inching valve 338 in any appropriate range (steplessly). Moreover, it is possible to steplessly adjust the speed of the work machine 1 (the output power of the travel device 17) in a state in which the pedal 111 is not operated (a state in which the pedal 111 is at the initial position of the stroke).

The movement member 504 includes the tubular outer shaft 504; and the switching mechanism 512 includes the inner shaft 521 that is inserted into the outer shaft 504 and that is capable of performing movement in the axial direction of the outer shaft 504, and is switchable between the first state and the second state in accordance with the movement of the inner shaft 521.

With this configuration, because it is possible to switch between the first state and the second state by moving the inner shaft 521 in the axial direction of the outer shaft 504, it is possible to allow the switching mechanism 512 to have a simple configuration, and the switching mechanism 512 has high operability.

The switching mechanism 512 includes the first engagement portion 513 that is formed to be included in the outer shaft 504, the second engagement portion 538 that is immovably disposed on the outer peripheral side of the outer shaft 504 at a predetermined interval in the axial direction, and the engagement member 541 that is engaged with the first engagement portion 513 and released from the second engagement portion 538 when in the first state and that is engaged with the first engagement portion 513 and the second engagement portion 538 when in the second state.

With this configuration, it is possible to switch between the first state and the second state by moving the engagement member 541 in the axial direction of the outer shaft 504 to switch the engagement member 541 between a state of being engaged with the second engagement portion 538 and a state of being released from the second engagement portion 538.

The switching mechanism 512 includes the wire 536 that is helically wound around the outer side of the outer shaft 504, and the second engagement portion 538 includes the gap between turns of the wire 536, the gap appearing at a predetermined interval in the axial direction.

With this configuration, for example, because it is possible to form the second engagement portion 538 from a component such as the coil spring 537 in which the wire 536 is helically wound, it is possible to form the second engagement portion 538 easily and at a low cost.

The first engagement portion 513 includes the through-hole 513 formed in the outer shaft 504, the engagement member 541 includes the ball 541 that is engageable in the through-hole 513 and into the gap 538, and the ball 541 is engaged with the through-hole 513 and released from the gap 538 when in the first state and is engaged with the through-hole 513 and the gap 538 when in the second state.

With this configuration, it is possible to easily and reliably perform an operation of causing the engagement member 541, which includes the ball 541, to be engaged with or released from the first engagement portion 513, which includes the through-hole 513, and the second engagement portion 538, which includes the gap between turns of the wire 536.

The inner shaft 521 includes the first recessed portion 524 and the second recessed portion 525 that are formed side by side in the axial direction thereof, the second recessed portion 525 is recessed deeper than the first recessed portion 524, and the ball 541 is fitted into the first recessed portion 524 when in the first state and is fitted into the second recessed portion 525 when in the second state.

With this configuration, by moving the inner shaft 521 in the axial direction of the outer shaft 504, it is possible to easily and reliably switch between the first state in which the ball 541 is fitted into the first recessed portion 524 and the second state in which the ball 541 is fitted into the second recessed portion 525.

The outer shaft 504 is rotatable around the central axis X1, the ball 541 performs helical movement along the wire 536 in accordance with rotation of the outer shaft 504, and the outer shaft 504 moves in the axial direction in accordance with the movement of the ball 541.

With this configuration, it is possible to move the outer shaft 504 by a distance smaller than the gap 538 between turns of the wire 536, because the outer shaft 504 rotates around the central axis X1 and thus the outer shaft 504 moves in the axial direction. Thus, it is possible to finely adjust the first position P1 of the swing member 501, and it is possible to finely adjust the initial position of the stroke of the brake the pedal 111 to a position that an operator desires.

The work machine 1 includes the steering wheel 15 that operates the travel device 17 and the steering column 87 that supports the steering wheel 15, and the adjuster 511 is attached to a side surface of the steering column 87.

With this configuration, the adjuster 511 is disposed at a position such that an operator sitting on the driver's seat 13 can easily reach and operate. Therefore, the adjuster 511 has high operability. Moreover, the adjuster 511 does not interrupt the view of an operator.

The adjuster 511 is disposed at a position where the adjuster 511 overlaps the steering wheel 15 in the front-back direction K1 and the machine-body-width direction K2.

With this configuration, an operator sitting on the driver's seat 13 can easily operate the adjuster 511, and the adjuster 511 does not hinder stretching of a leg of the operator.

The shaft sealing structure according to the present embodiment includes: the shaft (outer shaft) 504; the cover 550 that has the opening 551a through which the shaft 504 is inserted; and the sealing member 560 that seals between the outer peripheral surface of the shaft 504 and the opening edge of the opening 551a. The shaft 504 is capable of performing movement relative to the cover 550 in the axial direction D of the shaft 504. The sealing member 560 includes the inner edge portion 561 that is in close contact with the outer peripheral surface of the shaft 504 by elastic deformation and the outer edge portion 562 that is attached to the opening edge of the opening 551a. The inner edge portion 561 has a curved-surface shape that bulges toward the outer peripheral surface. The recessed groove 571 into which the opening edge is fitted is formed in the outer edge portion 562.

With this configuration, it is possible to exhibit high sealing performance due to the inner edge portion 561, which has a curved-surface shape, of the sealing member 560. It is possible to easily attach the sealing member 560 because the opening edge of the opening 551a is fitted into the recessed groove 571 formed in the outer edge portion 562 of the sealing member 560.

The inner edge portion 561 is in contact with the outer peripheral surface of the shaft 504 over the entire area in the circumferential direction.

With this configuration, the sealing member 560 can exhibit high sealing performance over the entire area of the outer peripheral surface of the shaft 504 in the circumferential direction. The shaft 504 is inclined with respect to a vertical direction so as to shift from one side to the other side toward a lower part thereof, and the cover 550 includes the first plate 551 in which the opening 551a is formed and that is inclined downward from the other side toward the one side.

With this configuration, even if water enters the recessed groove 571 of the sealing member 560, it is possible to cause the water to detour along the recessed groove 571 from the other side toward the one side of the shaft 504 due to the inclination of the first plate 551. Therefore, it is possible to prevent water that has entered the recessed groove 571 of the sealing member 560 from adhering to the shaft 504. The cover 550 includes the second plate 552 that is connected to the first plate 551 on the one side of the shaft 504, and the second plate 552 is inclined so as to shift from the one side to the other side toward a lower part thereof.

With this configuration, it is possible to more reliably prevent adhesion of water to the shaft 504, because water that has flowed along the inclination of the first plate 551 from the other side of the shaft 504 is led toward the one side of the shaft 504 and then flows downward along the inclination of the second plate 552.

The cover 550 includes the third plate 553 that is connected to a lower end part of the second plate 552, and the water drain hole 575 is formed in the third plate 553.

With this configuration, it is possible to prevent accumulation of water inside of the cover 550, because it is possible to drain water that has flowed downward along the second plate 552 to the outside of the cover 550 from the water drain hole 575 of the third plate 553.

The work machine 1 includes: the machine body 2; the travel device 17 that supports the machine body so that the machine body 2 is capable of traveling; the hydraulic drive 353 that hydraulically drives the travel device 17; the pedal (brake pedal) 111 for performing a braking operation of the travel device 17; the inching valve 338 that changes, in response to an operation of the pedal 111, the flow rate of a hydraulic fluid supplied to the hydraulic drive 353; and the shaft (outer shaft) 504 that adjusts the stroke of an operation of the pedal 111 by performing movement in an axial direction; the cover 550 that covers the outer peripheral side of the shaft 504 and that has a through-hole through which the shaft 504 is inserted; and the sealing member 560 that seals between the outer peripheral surface of the shaft 504 and the opening edge of the opening 551a. The sealing member 560 includes the inner edge portion 561 that is in close contact with the outer peripheral surface of the shaft 504 by elastic deformation and the outer edge portion 562 that is attached to the opening edge of the opening 551a. The inner edge portion 561 has a curved-surface shape that bulges toward the outer peripheral surface. The recessed groove 571 into which the opening edge is fitted is formed in the outer edge portion 562.

With this configuration, in the work machine 1 including the inching valve 338 that is activated in response to an operation of the pedal 111, the sealing structure between the shaft (outer shaft) 504 that adjusts the stroke of the operation of the pedal 111 and the cover 550 having the through-hole through which the shaft 504 is inserted is a structure that has high water sealing performance and that allows easy attachment of the sealing member 560. To be specific, it is possible to exhibit high sealing performance due to the inner edge portion, which has a curved-surface shape, of the sealing member 560. Moreover, it is possible to easily attach the sealing member 560, because the opening edge of the opening 551a is fitted into the recessed groove 571 formed in the outer edge portion of the sealing member 560.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work machine comprising:
   a machine body;
   a travel device that supports the machine body so that the machine body is capable of traveling;
   a hydraulic drive that hydraulically drives the travel device;
   a pedal for performing a braking operation of the travel device;
   an inching valve that changes, in response to an operation of the pedal, a flow rate of a hydraulic fluid supplied to the hydraulic drive; and
   an adjuster that adjusts a stroke of an operation of the pedal,
   wherein the adjuster includes
      a swing member that swings in coordination with an operation of the pedal and that is at a first position when the pedal is at an initial position of the stroke,
      a movement member that is capable of performing movement in contact with the swing member and that changes the first position by performing the movement in contact with the swing member, and
      a switching mechanism that is switchable between a first state in which the switching mechanism allows the movement of the movement member and a second state in which the switching mechanism prohibits the movement of the movement member,
   wherein the movement member includes a tubular outer shaft,
   wherein the switching mechanism includes
      an inner shaft that is inserted into the outer shaft and that is capable of performing movement in an axial direction of the outer shaft,
      a first engagement portion that is formed to be included in the outer shaft,
      a second engagement portion that is immovably disposed on an outer peripheral side of the outer shaft at a predetermined interval in the axial direction, and
      an engagement member that is engaged with the first engagement portion and released from the second engagement portion when in the first state and that is engaged with the first engagement portion and the second engagement portion when in the second state,
   wherein the switching mechanism is switchable between the first state and the second state in accordance with the movement of the inner shaft,
   wherein the switching mechanism includes a wire that is helically wound around an outer side of the outer shaft, and
   wherein the second engagement portion includes a gap between turns of the wire, the gap appearing at the predetermined interval in the axial direction.

2. The work machine according to claim 1,
   wherein the first engagement portion includes a through-hole formed in the outer shaft,
   wherein the engagement member includes a ball that is engageable in the through-hole and into the gap, and wherein the ball is engaged in the through-hole and released from the gap when in the first state and is engaged in the through-hole and the gap when in the second state.

3. The work machine according to claim 2,
wherein the inner shaft includes a first recessed portion and a second recessed portion that are formed side by side in an axial direction thereof,
wherein the second recessed portion is recessed deeper than the first recessed portion, and
wherein the ball is fitted into the first recessed portion when in the first state and is fitted into the second recessed portion when in the second state.

4. The work machine according to claim 2,
wherein the outer shaft is rotatable around a central axis,
wherein the ball performs helical movement along the wire in accordance with rotation of the outer shaft, and
wherein the outer shaft moves in the axial direction thereof in accordance with the movement of the ball.

5. The work machine according to claim 1, comprising:
a steering wheel that operates the travel device; and
a steering column that supports the steering wheel,
wherein the adjuster is attached to a side surface of the steering column.

6. The work machine according to claim 5, wherein a rear end of the adjuster is located rearward of a front end of the steering wheel and forward of a rear end of the steering wheel, and a left end of the adjuster is located rightward of a left end of the steering wheel and leftward of a right end of the steering wheel.

7. The work machine according to claim 1, further comprising:
a steering wheel that operates the travel device;
a steering column that supports the steering wheel; and
a block to accommodate the wire therein, the block having fixed thereto a fixed plate attached to a column frame of the steering column.

8. The work machine according to claim 7, wherein
the adjuster includes a cover that covers an outer peripheral side of the outer shaft,
the cover includes an upper plate including an opening through which the outer shaft is inserted,
the outer shaft is capable of performing movement relative to the cover in the axial direction, and
the block is disposed inside the cover.

* * * * *